(12) United States Patent
Kawahito et al.

(10) Patent No.: US 6,519,765 B1
(45) Date of Patent: Feb. 11, 2003

(54) METHOD AND APPARATUS FOR ELIMINATING REDUNDANT ARRAY RANGE CHECKS IN A COMPILER

(75) Inventors: Motohiro Kawahito, Sagamihara (JP); Toshiaki Yasue, Sagmihara (JP); Hideaki Komatsu, Yokohama (JP)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/350,242

(22) Filed: Jul. 9, 1999

(30) Foreign Application Priority Data

Jul. 10, 1998 (JP) .......................................... 10-195316
Dec. 25, 1998 (JP) .......................................... 10-370460

(51) Int. Cl.⁷ ................................................. G06F 9/44

(52) U.S. Cl. ........................ 717/127; 717/131; 717/132; 717/133; 717/157; 717/158; 711/108; 714/35

(58) Field of Search ................................ 717/154, 155, 717/146, 159, 133, 151, 156, 160, 161, 152, 127, 131, 132, 1, 108, 157, 158; 714/35

(56) References Cited

U.S. PATENT DOCUMENTS

| | | | | |
|---|---|---|---|---|
| 5,107,418 A | * | 4/1992 | Cramer et al. | 717/146 |
| 5,293,631 A | * | 3/1994 | Rau et al. | 717/146 |
| 5,535,329 A | * | 7/1996 | Hastings | 714/35 |
| 5,889,999 A | * | 3/1999 | Breternitz et al. | 712/201 |
| 5,933,855 A | * | 8/1999 | Rubinstein | 711/1 |
| 6,324,629 B1 | * | 11/2001 | Kulkarni et al. | 711/118 |
| 6,343,375 B1 | * | 1/2002 | Gupta et al. | 717/152 |
| 6,378,066 B1 | * | 4/2002 | Lewis | 712/13 |

OTHER PUBLICATIONS

Title: Array codes with Progressive Redundancy, author: Roth et al, IEEE, 1997.*

Title: Energy Optimization of Multilevel Cache architectures for RISC and CISC Processors, author: Poras et al, IEEE, 1998.*

"Optimization of Array Subscript Range Checks", by Jonathan M. Asuru, ACM Letters on Programming Languages and Systems, vol. 1, No. 2, Jun. 1992, pp. 109–118.

(List continued on next page.)

*Primary Examiner*—Kakali Chaki
*Assistant Examiner*—Chameli C. Das
(74) *Attorney, Agent, or Firm*—Scully, Scott, Murphy & Presser; Manny W. Schecter, Esq.

(57) ABSTRACT

Java language is, as its specification, capable of detecting an access exceeding an array range, and when there is no user-defined exception handler, moving control to an invoked method after getting out of a method in which an exception occurred, or when there is a user-defined exception handler, moving the process to the exception handler. Accordingly, an array range check is essential since occurrence of an exception may be described as a correct operation. However, an array range check slows execution speed compared with a language which does not require it. In an actual program, there is an array access to ensure that there is no access exceeding a range, and thus elimination of such redundant range checks greatly contributes to improved performance, and in addition, brings about an effect of expanding the range of optimization from the viewpoint of ensuring order of execution between occurrence of an exception and a process with a side effect such as an assignment of a value to an array.

8 Claims, 5 Drawing Sheets

OTHER PUBLICATIONS

"A Reexamination of 'Optimization of Array Sugbscript Range Checks'", by Wei–Ngan Chin, et al., ACM Transactions on Programming Languages and Systems, vol. 17, No. 2, Mar. 1995, pp. 217–227.

"Fast, Effective Code Generation in a Just–In–Time Java Compiler", by Ali–Reza Adl–Tabatabai, et al., SIGPLAN '98 Montreal, Canada, ACM 0-89791-987-4/98/0006, pp. 280–290.

"Interative Type Analysis and Extended Message Splitting: Optimizing Dynamically–Typed Object–Oriented Programs"; Craig Chambers and David Ungar; Originally published in the Proceedings of the ACM SIGPLAN '90 conference on Programming Language Design and Implementation(SIGPLAN Notices, 25,6(1990)150–162).

"Optimizing Array Bound Checks Using Flow Analysis"; Rajiv Gupta, University Of Pittsburgh; ACM Letters on Programming Languages and Systems, vol. 2, Nos. 1–4, Mar. Dec. 1993, pp. 135–150.

"Optimizing Array Reference Checking in Java Programs"; Samuel P. Midkiff, José E. Moreira Marc Snir: RC21184 (94652) May 18, 1998; Computer Science/Mathematics. IBM Research Division, TJ Watson Research Center, Yorktown Heights, NY 10598.

"Elimination of Redundant Array Subscript Range Checks", P. Kolte and M. Wolfe; ACM SIGPLAN '95 conference on Programming Language Design and Implementation; La Jolla, CA Jun. 18–21, 1995.

* cited by examiner

METHOD AND APPARATUS FOR ELIMINATING REDUNDANT ARRAY RANGE CHECKS IN A COMPILER

BACKGROUND OF THE INVENTION

1. Technical Field

The present invention relates to a compiler, more particularly to a method for eliminating or optimizing an array range check in a compiler. An array range check is a check on whether an array access in a program is exceeding its array range.

2. Prior Art

Several methods exist for eliminating an array range check based on the background art.

One such method is for checking the possibility of a range exceeding before a loop. (See "Elimination of Redundant Array Subscript Range Checks", Priyadarshan Kolte and Michael Wolfe, In proceedings of the ACM SIGPLAN '95 Conference on Programming Language Design and Implementation, pp. 270 to 278, June 1995, etc.)

Table 1 in which 0 is the lower bound of an array and N is its size is modified to Table 2 as follows.

TABLE 1

```
for (i = start; i <= end; i++) a[i] = 0;
```

TABLE 2

```
if ((start <= end) &&
    (start < 0 || end > N-1)) {
    exception; /* exceed an array range in a loop */
}
for (i = start; i <= end; i++) a[i] = 0; /* no check
required */
```

In the pseudocode of Table 1, 0 is assigned to each element of the array a. In the pseudocode of Table 2, an exception occurs in the case that the condition of if statement is fulfilled since the array access may exceed the array range, and processes it as in Table 1 in the case that it is not fulfilled.

The advantage of this method is that every array range check in a loop can be eliminated in the case that upper and lower bounds of the array access in the loop are certainly known. However, it has the following disadvantages as well. Namely, this method can only apply to a language whose specification defines that it is an error to exceed a range. Moreover, it can only apply when an array index in a loop changes monotonously. In addition, it cannot apply in the case that an ending condition of a loop cannot be put out of the loop, for instance, when end is a global variable, etc. in the above instance and end is changed by itself in the loop or by another thread.

A second method is for dividing a loop into three (See "Optimizing Array Reference Checking in Java Programs", Samuel P. Midkiff, Jose E. Moreira, Mark Snir, IBM Research Report RC21184(94652), Computer Science/Mathematics, May 18, 1998, etc.)

This method divides a loop into three parts, namely a part not to be checked, a part for checking its lower bound, and a part for checking its upper bound. For instance, if the lower bound of an array is 0 and its size is N, Table 1 is modified to Table 3 as follows.

TABLE 3

```
for (i = start; i <= min ( max(start, 0) -1, end ) ; i++) a [i]
    = 0;
for (i = max( start, 0 ) ; i <= min( end, N-1 ) ; i++) a [i]
    = 0;
                /* no check required */
for (i = max( start, min( end, N-1 ) + 1 ) ; i <= end; i++)
    a [i] = 0;
```

If divided into three in this way, in the second for-loop part, range checks can be omitted. The basic idea in this method is similar to method (1). The advantage of this method is that every array range check in a loop can be eliminated in the case that upper and lower bounds of the array access in the loop are certainly known. However, it can only apply when an array index in a loop changes monotonously. In addition, it cannot apply in the case that an ending condition of a loop cannot be put out of the loop, for instance, when end is a global variable, etc. in the above instance and end is changed by itself in the loop or by another thread. Furthermore, it requires special handling when applied to a large loop since the code size becomes three times larger.

A third method is for making array bases and indexes of the same value already checked (See the same documentation as method (1))

If there is an array access a[i] which is already checked, this method makes a[i] already checked within a range controlled from there and having the same values of a and i. Table 4 shows an example.

TABLE 4

```
i = k;
a [i] = j; /* check required */
a [0] = 0; /* check required */
if (...) a [i] ++; /* no check required */
t = a [i]; /* no check required */
if (...) {
    i++;
    a [i-1]++; /* check required */
    a [i]++; /* check required */
}
t = a [i]; /* check required */
```

The advantage of this method is that it can apply to other places than a loop. However, it has a disadvantage that the range to be determined as already checked is small.

A fourth method is directed to for eliminating an array check by using a range of values of a variable (See "Iterative Type Analysis and Extended Message Splitting", CRAIG CHAMBERS, DAVID UNGAR, Optimizing Dynamically-Typed Object-Oriented Programs, etc.)

It is a method to narrow down a range of a variable from information such as if statement, and eliminate an array range check by using the information. For instance, if a lower bound of an array is 0, the part which has no check required written in its comment field is an array access to be determined as no check required by this method.

TABLE 5

```
if (3 <= i && i <= 5) {
    /* it is understood the range of the value which i has
    is 3 to 5 */
    a [i] = j; /* check required */
    a [i-1] = 0; /* no check required from 0 < i-1 < i */
```

TABLE 5-continued

```
    a [(i-3)*2] = 0; /* no check required from 0 <=
    (i-3)*2 < i */
}
```

The advantage of this method is that it can apply to other places than a loop. Even if an expression of an array index is complicated as in method (1), it may be handled as already checked. However, in reality there are many cases in which a range of a variable cannot be narrowed down.

A fifth method is directed to eliminating an array check by using data-flow analysis (See "Optimizing array bound checks using flow analysis", R. Gupta, ACM Letters on Programming Languages and Systems, 2(1–4), pp. 135 to 150, March–December, 1993, etc.)

This method eliminates an array range check by the following two-phased process. Namely, (1) Insert a check near the beginning in program execution order so as to decrease array range checks. (2) Eliminate redundant array range checks.

The advantage of this method is that it can apply to other places than a loop. However, it has its disadvantages, namely, the range in which it can eliminate array range checks is narrow and it can only apply to a language whose specification defines that it is an error to exceed a range.

An object of the present invention is to eliminate redundant array range checks by collecting array range check information by using data-flow analysis, etc. and moving up the checks. The redundant array range checks referred to here are those for an array access which can ensure that the array range check does not exceed its range because there is a preceding array access.

In Java (a trademark of Sun Microsystems) language, an exception occurs as its specification as a result of a range check at an array access. As this occurrence of an exception may be used to write a program, a program will not run correctly without performing array range checks. Another object of the present invention is to allow more array range checks to be eliminated by coping with a language in which occurrence of an exception may be used to write a program.

A further object of the present invention is to optimize an array range check by collecting array range check information through data-flow analysis, etc.

A still further object of the present invention is to perform a versioning for a loop by collecting array range check information on a predetermined condition.

SUMMARY OF THE INVENTION

To achieve the above-mentioned objects, this invention may be categorized into the following three parts. Namely, (A) a part to eliminate redundant array range checks by performing a versioning for a loop, (B) a part to optimize array range checks by performing data-flow analysis in reverse order of the program execution, and (C) a part to obtain information about array ranges already checked by performing data-flow analysis in program execution order and eliminate redundant array range checks from this information.

In (A), the following process is performed (FIG. 2 in the Embodiments). Namely, following steps are executed in performing a versioning for a loop by using-array range check information for an array access in a program; in each basic block, collecting and storing in a storage a first information about array range checks to be processed (C_GEN[B] in the Embodiments), in reverse order of the program execution according to a first condition (Table 8 in the Embodiments), wherein the first information is a set of array range checks; propagating the first information according to a second condition in order of a post-order traversal of a depth-first search (DFS) (Backward(C_OUT[B], B) (Table 9) and a process using it (FIG. 3) in the Embodiments), and generating and storing in a storage a second information about array range checks to be processed (C_IN[B] in the Embodiments) at the beginning of each basic block; and by using the second information, generating and storing in a storage a check code for the versioning before the loop and execution codes for each execution state. This divides into two execution states by check code classification, namely a loop without any array range check and a loop with array range checks, so processing becomes faster if execution shifts to a loop without any array range check.

The above-mentioned first condition may include conditions in a basic block, namely (1) if an index variable of an array access is not modified, collecting array range check information for the array access as it is; and (2) if an index variable in an array range check is modified by adding a positive or negative constant, collecting array range check information after reflecting the modification caused by adding the constant to the index variable. The latter condition expands the range of array range checks which can be handled.

The above-mentioned second condition may include a condition of: calculating a sum set of the first information about array range checks to be processed in a certain basic block and a fourth information about array range checks to be processed, wherein fourth information is a third information (C_OUT[B] in the Embodiments) about array range checks to be processed at the end of the certain basic block after being modified according to a third condition (backward(C_OUT[B], B) in the Embodiments).

The above-mentioned third condition may include a condition of: if, in the certain basic block, an index variable in an array range check included in the third information about array range checks to be processed is modified by adding a positive or negative constant, reflecting the modification caused by adding the constant to the index variable on the array range check included in the third information.

It is also possible that the third information about array range checks to be processed is generated by using the second information about array range checks to be processed of every basic block immediately after the certain basic block and included in the same loop as that of the certain basic block.

The above-mentioned collecting and storing step, if described in more detail, comprises the steps of: checking, in reverse order of the program execution, an instruction in the basic block; if the check determines the instruction includes an array access, storing in a storage information concerning an array range check necessary for the array access; if the check determines the instruction includes a modification of an array index variable associated with the stored array range check, determining whether the modification is an addition of a positive or negative constant; if the modification is an addition of the constant, calculating a modification of the array range check which is caused by the addition of the constant to the array index variable in the array range check; and storing in a storage an array range check after reflecting the modification of the array range check. This is a process which was not handled in the method (5) in the background art.

In the case of (B) described below, the collecting and storing step may comprise the following step. Namely, if the check determines the instruction causes a side effect due to any exception which is caused by an array range check and occurs earlier than the instruction, discarding the array range check stored before the check. It is because, in the case of (B), it is not possible to handle it if there is an instruction which causes a side effect.

Next, the case of (B) (FIG. 4 in the Embodiments) is described. Namely, following steps are executed in the case of optimizing an array range check for an array access in a program: in each basic block, collecting and storing in a storage a first information about array range checks to be processed (C_GEN[B] in the Embodiments) in reverse order of the program execution according to a first condition (Table 12 in the Embodiments), wherein the first information is a set of array range checks; propagating the first information through a data-flow analysis of the program by using information whether a side effect instruction so that a side effect is caused by moving an array range check issuing an exception before the side effect instruction is included in a basic block and according to a second condition (backward (C_OUT[B], Table 13, and FIG. 5) in the Embodiments), and generating and storing in a storage a second information about array range checks to be processed (C_OUT[B] in the Embodiments) at the end of each basic block; and in each basic block, generating and storing in a storage codes for array range checks by following each instruction in reverse order of the program execution with modification of the second information according to a third condition (Table 14 in the Embodiments) and by using the second information. While this process itself does not eliminate any array range check, it can be changed to more desirable array range checks by using it together with (A) or (C), or (A) and (C). It is also possible to combine it with a technique of a conventional technology.

The above-mentioned first condition may include conditions of, in a basic block: (1) if an index variable of an array access is not modified, collecting array range check information for the array access as it is; (2) if an index variable in an array range check is modified by adding a positive or negative constant, collecting array range check information after reflecting the modification caused by adding the constant to the index variable; and (3) if the basic block includes the side effect instruction, discarding array range check information collected in the basic block. The conditions of (2) and (3) were not previously taken up.

The above-mentioned second condition may include conditions of: (1) if a certain basic block is at the end of the program, or if the certain basic block is not at the end of the program and still includes the side effect instruction, propagating as information about array range checks to be processed at the beginning of the certain basic block the first information itself of the certain basic block; and (2) if the certain basic block is not at the end of the program and does not include the side effect instruction, propagating as the above information a sum set of a third information about array range checks to be processed and the first information of the certain basic block, wherein the third information is the second information of the certain basic block after being modified according to a fourth condition.

The above-mentioned third condition may include the conditions of: (1) if an index variable in an array range check is modified by adding a positive or negative constant, correcting to the array range check information after reflecting the modification caused by adding the constant to the index variable; and (2) if the basic block includes the side effect instruction, discarding array range check information collected in the basic block.

The above-mentioned generating and storing step may include the step of: if a range of an array range check for an array access is smaller than that of an array range check included in the second information, generating for the array access a code for the array range check included in the second information.

The above-mentioned fourth condition may include conditions of: if, in a certain basic block, an index variable in an array range check included in the second information is modified by adding a positive or negative constant, reflecting the modification caused by adding the constant to the index variable on the array range check included in the second information.

To describe in further detail the above-mentioned generating and storing step, in generating a code for an array range check to be inserted when optimizing an array range check in a program by using information about array range checks to be processed (C_OUT[B] in the Embodiments), wherein the information is a set of array range checks required for an array access and propagated to the end of each basic block, following steps are executed: checking, in reverse order of the program execution, an instruction in the basic block; if the check determines the instruction includes an array access, determining whether the range required for the array access is smaller than that of the array range check in the information; if it is determined to be smaller, generating a code corresponding to the array range check in the information; if the check determines the instruction includes a modification of an array index variable included in the information, determining whether the modification is an addition of a positive or negative constant to the array index variable; if the modification is an addition of the constant, storing the constant in a storage; if the modification is an addition of the constant, calculating a modification of the array range check which is caused by the addition of the constant to the index variable in the array range check; and storing in a storage the array range check after reflecting the calculated modification of the array range check. Information about array range checks to be processed includes the range to generate a code corresponding to the array range check, so a code for an optimum array range check is generated by transforming and using it.

It is possible to include the steps of: determining whether the instruction causes a side effect due to any exception caused by the array range check, wherein the exception occurs earlier than the instruction; and if the determination is true, discarding the information about array range checks to be processed. It shows a case which cannot be handled by this invention.

In (C), the following process is performed (FIG. 7 in the Embodiments). Namely, to eliminate a redundant array range check of array range checks in a program, following steps are executed: in each basic block, collecting a first information about array range checks already processed (C_GEN[B] in the Embodiments), in program execution order according to a first condition (Table 16 in the Embodiments), wherein the first information is a set of array range checks; propagating the first information along a data-flow of the program according to a second condition (Table 17 and FIG. 8 in the Embodiments), and generating a second information about array range checks already processed (C_IN[B] in the Embodiments) at the beginning of each basic block; and in each basic block, eliminating an array range check by following each instruction in program execution order with modification of the second information according to a third condition (Table 18 in the Embodiments) and by using the second information. It eliminates redundant array range checks by using data-flow analysis.

The above-mentioned first condition may include conditions of, in a basic block: (1) if an index variable of an array access is not modified, collecting array range check information for the array access as it is; and (2) if an index variable in an array range check is modified by adding a positive or negative constant, collecting array range check information after reflecting the modification caused by subtracting the constant from the index variable. As it includes the case of (2), it has a wider range of array range checks to be eliminated. The above-mentioned first condition may further include a condition of: collecting a range defined by upper and lower bounds which can be handled as already checked as to a constant index from a minimum constant offset and a maximum constant offset of an array index in the array range check and a lower bound of the array. It further expands the range of elimination.

The above-mentioned first condition may include a condition of: collecting the range defined by upper and lower bounds which can be handled as already checked as to a constant index from a lower limit value or a upper limit value of an index variable in the array range check and a lower bound of the array.

The above-mentioned second condition may include conditions of: (1) if a certain basic block is at the beginning of a program, propagating as information about array range checks to be processed at the end of the certain basic block a first information itself about array range checks already processed of the certain basic block; and (2) if the certain basic block is not at the beginning of the program, propagating as the above information a sum set of a third information about array range checks already processed and the first information of the certain basic block, wherein the third information is the second information of the certain basic block after being modified according to a fourth condition.

The above-mentioned third condition may include a condition of: if an index variable in an array range check is modified by adding a positive or negative constant, correcting to array range check information after reflecting the modification caused by subtracting the constant from the index variable.

The above-mentioned fourth condition may include a condition of: if, in the certain basic block, an index variable in an array range check included in the second information is modified by adding a positive or negative constant, reflecting the modification caused by subtracting the constant from the index variable on the array range check included in the second information. The above-mentioned step of eliminating array range checks (Table 18 in the Embodiments) is described in further detail as follows. Namely, to eliminate a redundant array range check of array range checks in a program, in selecting an array range check to be eliminated by using information about array range checks already processed (C_IN[B] in the Embodiments), wherein the information is a set of array range checks for an array access propagated to the beginning of each basic block, following steps are executed: checking, in program execution order, an instruction in the basic block; if the check determines the instruction includes an array access, determining whether the range of an array range check required for the array access is covered by that of the array range check included in the information; if it is determined to be covered, selecting an array range check required for the array access; if the above check determines the instruction includes a modification of an index variable of an array range check included in the information, determining whether the modification is an addition of a positive or negative constant to the index variable; if the modification is an addition of the constant, storing the constant in a storage; if the modification is an addition of the constant, calculating a modification of the array range check which is caused by subtracting the constant from the index variable in the array range check; and storing in a storage the array range check after reflecting the calculated modification of the array range check. This allows a wider range of array range checks to be eliminated.

The above-mentioned step of determining whether the range of an array range check is covered may include the steps of: checking if the index variables $I_k$ (k=1, . . . n) are included as to array range checks with the same array base in the information about array range checks already processed; if it is determined that the index variable $I_k$ for every k is included, determining whether the relation between constants L and n meets the predetermined condition; and if the relation between the constants L and n meets a predetermined condition, selecting an array range check of an array access whose array index is $(I_1+I_2+ \ldots +I_n)/L$. This allows a wider range of array range checks to be eliminated.

The step of determining whether the range of an array range check is covered may include the steps of: checking if a constant which has a value obtained by subtracting 1 from the absolute value of constant N is included as to array range checks on constant indexes in the information about array range checks already processed; if the constant is included and the information substantially includes the constant 0, determining whether A of the array index (A mod N) is positive; and if A is positive, selecting an array range check of an array access which includes the array index (A mod N). This allows a wider range of array range checks to be eliminated.

The collecting and storing steps of (A) and (B) and a part of processing in a second information about array range checks to be processed can be considered as processing for moving in opposite direction of the program execution an array range check to check that an array access in a program is not exceeding the array range, and to modify the array range check in this case, following steps are executed: determining whether the array range check has to move beyond the process of adding a positive or negative constant to an index variable of the array and storing the constant in a storage; if the determination is true, calculating the modification of the array range check caused by adding the constant to the index variable in the array range check; and storing in a storage the array range check after reflecting the calculated modification of the array range check.

Furthermore, the collecting steps of (C) and a part of processing in a second information can be considered as processing for moving in program execution direction an array range check to check that an array access in a program is not exceeding the array range, and to modify the array range check in this case, following steps are executed: determining whether the array range check has to move beyond the process of adding a positive or negative constant to an index variable of the array and storing the constant in a storage; if the determination is true, calculating the modification of the array range check caused by subtracting the constant to the index variable in the array range check; and storing in a storage the array range check after reflecting the calculated modification of the array range check.

To describe in further detail the characteristic processing in the collecting steps of (C), it is a process of collecting in a basic block of a program array range checks to check that an array access in the program is not exceeding the array range which can be handled as already checked. The process may comprises the steps of: detecting an array range check; storing in a storage the detected array range check; calculating and storing upper and lower bounds which can be handled as already checked as to a constant index from a minimum constant offset and a maximum constant offset of an array index in the detected array range check and a lower bound of the array; and storing in a storage the array range check on the range defined by the calculated upper and lower bounds.

To describe in further detail the characteristic processing in the array range check elimination steps of (C), it is a process of determining whether an array range check to check that the array access in a program is not exceeding the array range can be handled as already checked. The process may comprises the steps of: storing in a storage an array range check determined as already checked; checking if the index variables $I_k$ (k=1, . . . n) are stored in a storage as to array range checks determined as already checked and having the same array base; determining whether the relation between constants L and n meets a predetermined condition; and if it is determined that the index variables $I_k$ are stored for every k and the relation between the constants L and n meets the predetermined condition, storing in a storage an array access whose array index is $(I_1+I_2+. . . +I_n)/L$ as already checked.

It is also possible, in the same process, to further execute the steps of: storing in a storage an array range check determined as already checked; checking if a constant which has a value obtained by subtracting 1 from the absolute value of the constant N is stored in a storage as to array range checks determined as already checked and on constant indexes; determining whether A of the array index (A mod N) is positive; and if the constant is stored in a storage and the constant 0 is substantially already checked (including either case of the lower bound of the array index being 0 or not) and the A is positive, storing in a storage the array index (A mod N) as already checked.

As above, the present invention has been represented as a flow of processing, while it is also possible to implement it by a computer or a computer program, or a dedicated circuit or device which execute the above process. In the case of implementing it by a computer program, the computer program may be stored on a storage medium such as a CD-ROM, a floppy disk or a hard disk.

BRIEF DESCRIPTION OF THE DRAWINGS

Preferred embodiments of the present invention will now be described, by way of example only, with reference to the accompanying drawings in which.

DETAILED DESCRIPTION OF THE PREFERRED EMBODIMENTS OF THE INVENTION

Figure 1:
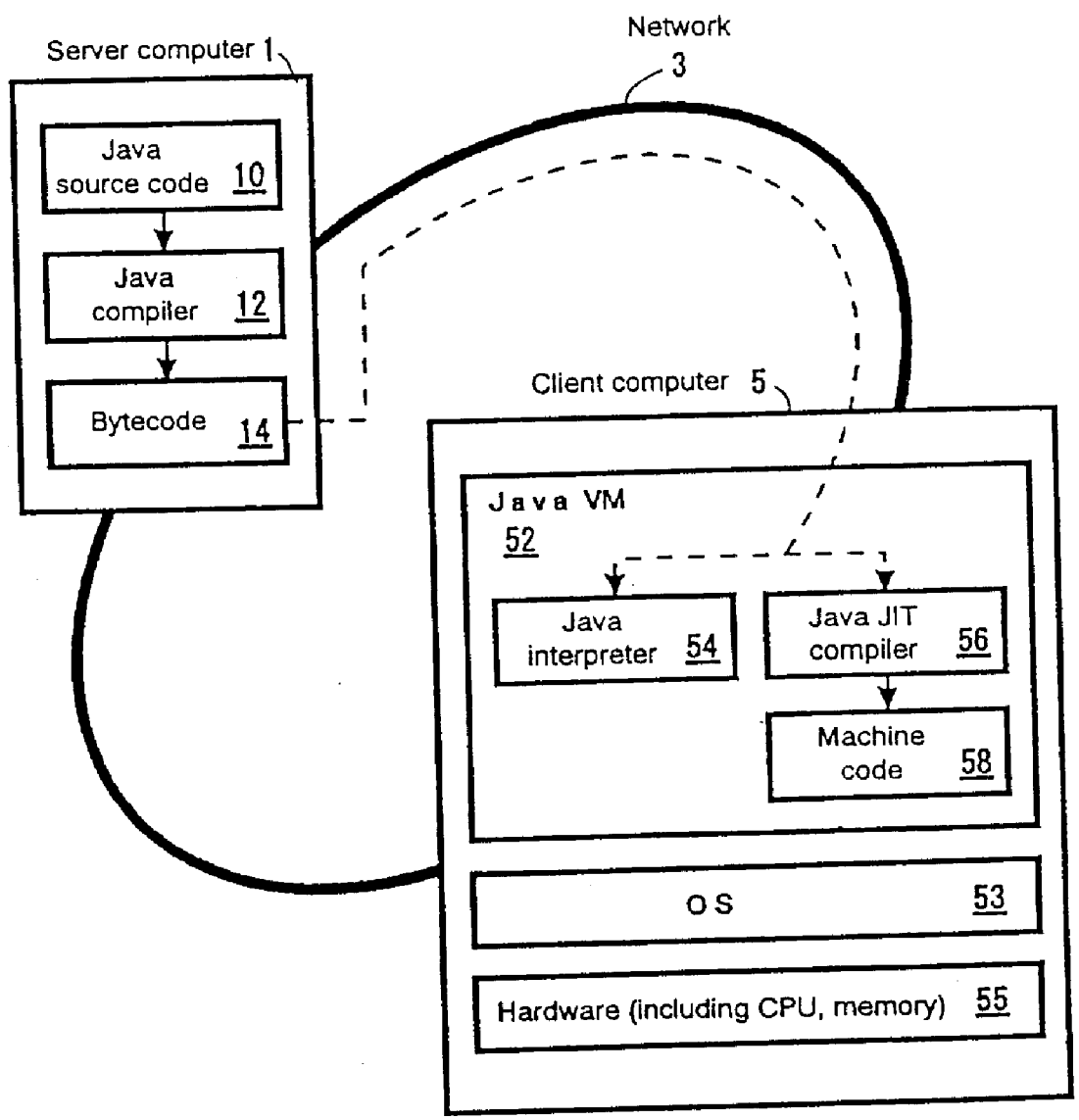
FIG. 1 is an overview of the entire system of the present invention.

Device configuration of the present invention in an environment using Java is described by using FIG. 1. Server computer 1 and client computer 5 are connected via network 3. Client computer 5 includes Java VM (Virtual Machine) 52 and OS (Operating System) 53 and hardware (including a CPU and memory) 55. In addition, Java VM 52 includes Java interpreter 54 or Java JIT compiler 56. It may have both interpreter 54 and JIT compiler 56. Client computer 5 may be, other than an ordinary computer, a so-called network computer or a home information appliance which has smaller size of memory or does not include any sub-storage such as a hard disk.

On server computer 1, Java source code 10 is compiled by Java compiler 12. The result of this compilation is bytecode 14. This bytecode 14 is sent to client computer 5 via network 3. Bytecode 14 is a native code for Java Virtual Machine (Java VM) 52 installed on a WWW browser (World Wide Web Browser) in client computer 5, etc., and Java interpreter 54 or Java JIT compiler 56 is used when actually executing on the CPU of hardware 55. Interpreter 54 decodes bytecode 14 at execution, and invokes and executes a processing routine prepared for each instruction. On the other hand, JIT compiler 56 converts a bytecode to machine code 58 by using a compiler in advance or immediately before execution and then executes it on the CPU.

The parts of JIT compiler 56 related to the present invention are described below.

(A) The part to eliminate redundant array range checks by a versioning for a loop.

Versioning is a process which, at compilation, (1) classifies execution states of a code of a certain part of a program into several states, and (2) generates at execution a check code to classify such states and an execution code of the certain part of the program for each state. Examples described in Java are shown in Table 6 and Table 7. In Table 6, there exists one loop which is iterated by loop variable i. In Java, a test of whether an array variable itself is null for an array access, and a check on whether an array index is within an array range are required at execution. For this loop, if array variable a is not null, it is classified into two cases depending on whether or not the range of change of loop variable i (here, it is also an array index variable) is within that of array a. The check code and the codes generated along with the check code are as shown in Table 7. By this versioning, in the case where array variable a is not null and loop variable i is within the range of array a (code on then side, however it is not represented "then" in Table 7), tests concerning the array access will always be successful so that these tests can be eliminated. On the other hand, in the case where array variable a is null or loop variable i may access outside the array range (code on "else" side), since, for an array access to a [i], array variable a may be null or loop variable i may access outside the array, a code for checking each of them is generated.

TABLE 6

```
public void f( int a[], int n ) {
    int i;
    for ( i=0; i<n; i++ ) {
        a [i] = a [i] * i;
    }
}
```

TABLE 7

```
public void f( int a[], int n
    int i;
    if ( a !=null && n <= a. length ) {
        // if array a is not null and
        // i only accesses within the range of array a
        for ( i=0; i<n; i++) {
            a [i] a [i] * i;
            // null test and range test for a[i] have
                been eliminated
        }
    } else{
        // if there is a case where i accesses outside
            the range of array a
        for ( i=0; i<n; i++) {
            // check( a != null );
            // check( i >= 0 );
            // check( i < a. length );
            a [i] = a [i] * i;
            // null test and range test for a [i] are
                necessary;
        }
    }
}
```

Figure 2:
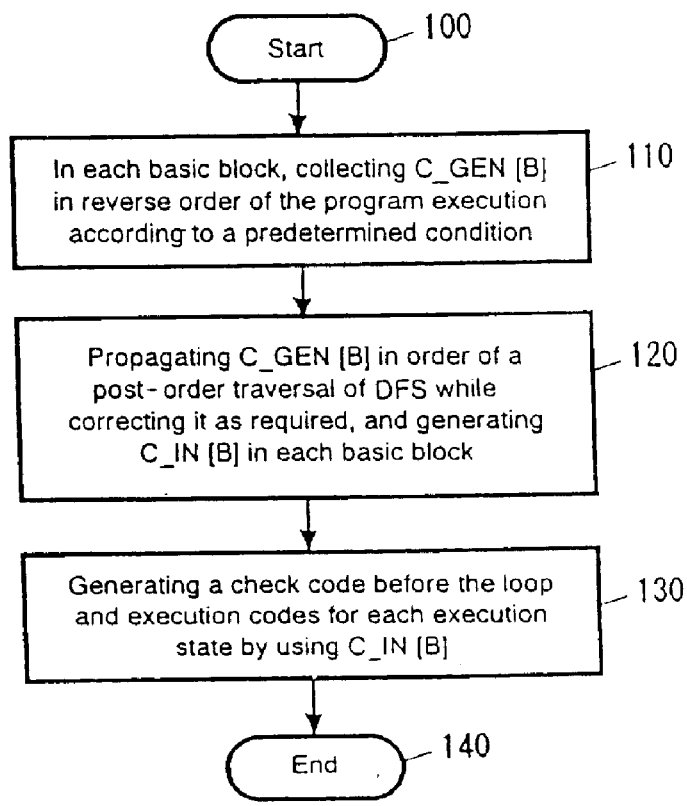
FIG. 2 is a flowchart for showing the main processing of (A), the part for eliminating a redundant array range check by a versioning for a loop.

FIG. 2 shows the outline of processing. First, in each basic block B, C_GEN[B] is collected in reverse order of the program execution according to a predetermined condition (step 110). Information of C_GEN[B] is stored in a storage. This C_GEN[B] in this case is a set of array index ranges in array accesses requiring array range checks. It is limited, however, to those collected pursuant to a predetermined condition detailed later. For instance, in the case of array index v in array a, from the lower bound lb(a) and upper bound ub(a) of array index v in array a, lb<=v, ub(a)>=v must be verified. Accordingly, lb<=v, ub(a)>=v is added to C_GEN[B]. Meanwhile, in general, it will be lb(a)<=f(v), ub(a)>=f(v) (f is a function). This step 110 will be detailed later.

Then, C_GEN[B] is propagated while adding necessary modification to it in order of a post-order traversal of a depth-first search (DFS), and C_IN[B] of each basic block B is generated (step 120). Information of C_IN[B] is stored in a storage. C_IN[B] is a set of array index ranges in array accesses requiring array range checks at the beginning of basic block B. This step 120 will also be detailed later.

Lastly, C_IN[B] is used to generate a check code for versioning before the loop and execution codes for each execution state (step 130). The check code and execution codes are stored in a storage for execution. In this way, as much as possible it determines in a check code at the beginning of the loop whether the normally required array range checks are necessary or not. Then, as shown in Table 7, if the condition of if statement in the third line which is a check code is met, only the array range checks in the loop to which this invention is applicable are eliminated. In Table 7, all the array range checks are eliminated. On the other hand, if the condition of if statement is not met, necessary array range checks are performed. Step 130 will also be detailed later.

Now, step 110 is explained in detail. In step 110, while in principle, handling the array range checks related to an instruction for modifying an array index or an array base as unrelated to this step, C_GEN[B] which is a set of array range checks at the beginning of a basic block is collected in reverse order of the program execution. However, in the case that an array index variable is modified to v=v+c (c is a positive or negative constant), not regarding it as unrelated to this step, an array index expression f(v) in set information C_GEN[B] is recalculated as f(v+c) and is replaced. The following shows a pseudocode of step 110.

TABLE 8

```
for (for each basic block, an instruction is taken out in
    reverse order of the program execution) {
    switch (instruction) {
        array access instruction:
            for the array range check C
                C_GEN[B] += C;
            break;
        instruction to modify array base variable a:
            for (all C ∈ C_GEN[B]) {
                if (lb (a) or ub (a) by modified array base a are
                    included in C) {
                    C_GEN[B] -= C;
                }
            }
            break;
        instruction to modify index variable v:
            for (all C ∈ C_GEN[B]) {
                if (C comprises modified index variable v
                    or expression f (v) of v) {
                    if (index variable v is modified by v = v+c
                        (c is a positive or negative constant : addition
                        or subtraction of the constant)) {
                        v of C is replaced by v+c, or f(v) by f(v+c)
                    } else {
                        C_GEN[B] -= C;
                    }
                }
            }
            break;
    }
}
```

The entire Table 8 is performed for each basic block. For each instruction in each basic block, processing in a for-loop is performed. Instructions are taken out in reverse order of the program execution. A switch statement is for executing a process specified under an applicable condition if the taken instruction matches with any of the conditions below the switch statement (three conditions here). These conditions are an array access instruction, an instruction to modify array base variable a, and an instruction to modify index variable v. In the case of an array access instruction, array range check C for the array access instruction is put in C_GEN[B]. In the case of an instruction to modify array base variable a, since this invention cannot handle array range check C related to this base variable a, a process of eliminating C from C_GEN[B] is executed. In the case of an instruction to modify index variable v, it is checked whether or not each array range check C in C_GEN[B] is related to the modified array index variable V. In the case of a check by a constant for upper or lower bound of an array index, modification operation of index variable v does not affect the check. It is determined whether the instruction to modify index variable v is an additive or subtractive instruction of a constant. If the instruction to modify index variable v is an additive or subtractive instruction of a constant, array range check C in C_GEN[B] also adds or subtracts a constant according to either addition or subtraction of the constant. In the case that modification of index variable v which cannot be handled by this invention is performed, the array range check C related to the index variable v is eliminated from C_GEN[B]. Step 120 is detailed next. This step 120 executes by using C_GEN[B] collected above, the following expression once for every basic block in order of a post-order traversal of a depth-first search, namely in order that the following basic blocks come first.

For every S that meets the conditions of being S ∈ Succ(B) and B and S being in the same loop,

C_OUT[B]=4 C_IN[S]

C_IN[B]=C_GEN[B]4 backward(C_OUT[B], B)

Succ(B) means every basic block immediately following B.

The above expression indicates the following. An array range check set C_OUT[B] at the end of a certain basic block B is a sum set of array range check sets C_IN[S] which are at the beginning of all the basic blocks S meeting the conditions of being S ∈ Succ(B) and basic blocks B and basic blocks S being in the same loop. In addition, C_OUT[B] newly becomes a set, backward(C_OUT[B], B) after being modified as predetermined according to modification to an array index performed in the basic block B by a process mentioned later. A sum set of this backward(C_OUT[B], B) and the earlier acquired C_GEN[B] is C_IN[B]. What is ultimately necessary is this C_IN[B]. This process is summarized in FIG. 3.

Now, processing of backward(C_OUT[B], B) is described by using the following pseudocode.

TABLE 9

```
backward (C_OUT [B], B) {
  T = 0;
  for (each array range check C ∈ C_OUT [B]) {
    case C of
      lb <= v:
        case AFFECT (B, v) of
          unchanged: T = T ∪ { lb <= v }
          increment: if added value C is a constant then
              T = T ∪ { lb <= v+c }
            /* otherwise not put into T */
          decrement: if subtracted value C is a constant then
              T = T ∪ { lb <= v-c }
            else
              T = T ∪ { lb <= v
          multiply: /* not put into T */
            div > 1: T = T ∪ { lb <= v }
            div < 1: /* not put into T */
          changed: /* not put into T */
        end case
      v <= ub:
        case AFFECT (B, v) of
          unchanged: T = T ∪ { v <= ub }
          increment: if added value C is a constant then
              T = T ∪ { v+c <= ub }
            else
              T = T ∪ { v <= ub }
          decrement: if subtracted value C is a constant then
              T = T ∪ { v-c <= ub }
            /* otherwise not put into T */
          multiply: T = T ∪ { v <= ub }
            div > 1: /* not put into T */
            div < 1: T = T ∪ { v <= ub 56
          changed: /* not put into T */
        end case
      lb <= f (v):
        case AFFECT (B, v) of
          unchanged: T = T ∪ { lb <= f (v) }
          increment: if f (v) is a monotonic function and
              added value C is a constant then
              T = T ∪ { lb <= f (v+c) }
            else
              if v increases f (v) decreases then
                T = T ∪ {lb <= f (v) }
```

TABLE 9-continued

```
          decrement: if f (v) is a monotonic function and
              subtracted value C is a constant then
              T = T ∪ {lb <= f (v-c) }
            else
              if v decreases f (v) also decreases then
                T = T ∪ { lb <= f (v) }
          multiply: div < 1:
            if v increases f (v) decreases then
                T = T ∪ { lb <= f (v) }
            div > 1: if v decreases f (v) also decreases then
                T = T ∪ { lb <= f (v) }
          changed: /* not put into T */
        end case
      f (v) <= ub:
        case AFFECT (B, v) of
          unchanged: T = T ∪ { f (v) <= ub }
          increment: if f (v) is a monotonic function and
              added value C is a constant then
              T = T ∪ { f (v+c) <= ub }
            else
              if v increases f (v) also increases then
                T = T ∪ { f (v) <= ub }
          decrement: if f (v) is a monotonic function and
              subtracted value C is a constant then
              T = T ∪ { f (v-c) <= ub }
            else
              if v decreases f (v) increases then
                T = T ∪ { f (v) <= ub }
          multiply: div < 1:
            if v increases f (v) also increases then
                T = T ∪ { f (v) <= ub }
            div > 1: if v decreases f (v) increases then
                T = T ∪ { f (v) <= ub }
          changed: /* not put into T */
        end case
      end case
  }
  return (T)
}
```

The final output of backward(C_OUT[B], B) is T. backward(C_OUT[B], B) is roughly divided into four parts depending on the contents of array range checks included in C_OUT[B]. Namely, it is the cases of lb<=v and v<=ub as to array index variable v, and the cases of lb<=f(v) and f(v)<=ub as to array index f(v). Each case is further divided by operation for array index variable v (AFFECT(B,v) in Table 9. B indicates the basic block being processed). Each case is described as follows.

(1) The case of lb<=v

If there is n o operation f or array index v ariable v (unchanged), lb<=v is put as is into array range check set T. If the array index is a constant, it is included in this unchanged. In the case of an operation of incrementing array index variable v (increment), it is determined whether added value c is a constant. If added value c is a constant, lb<=v+c is put into T. In case of any operation of incrementing v other than this, this invention does not handle it, so the array range check is not put into T. In the case of an operation of decrementing array index variable v (decrement), it is determined whether subtracted value c is a constant. If subtracted value c is a constant, lb<=v-c is put into T. In case of any operation of decrementing v other than this, lb<=v is put into T. If array index variable v is multiplied (multiply), this invention cannot handle it, so the array range check is not put into T. If array index variable v is divided by a value larger than 1 (div>1), lb<=v is placed as is in T. If array index variable v is divided by a value smaller than 1 (div<2), this invention cannot handle it, so the array range check is not put into T. In case of any operation other than above (changed), this invention cannot handle it, so the array range check is not put into T.

(2) The case of v<=ub

If there is no operation for array index variable v (unchanged), v<=ub is put into T. In the case of an operation of incrementing array index variable v (increment), if added value c is a constant, v+c<=ub is put into T. On the other hand, in case of any operation of incrementing v other than this, v<=ub is put into T. In the case of an operation of decrementing array index variable v (decrement), if subtracted value c is a constant, v−c<=ub is put into T. In case of any operation of decrementing v other than this, the array range check is not put into T. If array index variable v is multiplied (multiply), the array range check is not put into T. If array index variable v is divided by a value larger than 1 (div>1), the array range check is not put into T. If array index variable v is divided by a smaller value than 1 (div<1), v<=ub is put into T. In case of any operation other than above (changed), the array range check is not put into T.

(3) The case of lb<=f(v) If there is no operation for array index variable v (unchanged), lb<=f(v) is put into T. In the case of an operation of incrementing array index variable v (increment), if f(v) is a monotonic function and added value c is a constant, then, lb<=f(v+c) is put into T. Even if not so, in the case that f(v) decreases if v increases, then, lb<=f(v) is put into T. In the case of an operation of decrementing array index variable v (decrement), if f(v) is a monotonic function and subtracted value c is a constant, then, lb<=f (v−c) is put into T. Even if not so, in the case that f(v) decreases if v decreases, then, lb<=f(v) is put into T. If array index variable v is multiplied or if it is divided by a value smaller than 1 (multiply, div<1), in the case that f(v) decreases if v increases, then, lb<=f(v) is put into T. If array index v is divided by a value larger than 1 (div>1), lb<=f(v) is put into T. In case of any operation other than the above (changed), the array range check is not put into T.

(4) The case of f(v)<=ub

If there is no operation for array index variable v (unchanged), f(v)<=ub is put into T. In the case of an operation of incrementing array index variable v (increment), if f(v) is a monotonic function and added value c is a constant, then, f(v+c)<=ub is put into T. Even if not so, in the case that f(v) increases if v increases, then, f(v)<=ub is put into T. In the case of an operation of decrementing array index variable v (decrement), if f(v) is a monotonic function and subtracted value c is a constant, then, f(v−c) <=ub is put into T. Even if not so, in the case that f(v) increases if v decreases, then, f(v)<=ub is put into T. If array index variable v is multiplied or if it is divided by a value smaller than 1 (multiply, div<1), in the case that f(v) increases if v increases, then, f(v)<=ub is put into T. If array index v is divided by a value larger than 1 (div>1), f(v)<=ub is put into T. In case of any operation other than the above (changed), the array range check is not put into T. Step 130 is described in detail next. When performing a versioning for a loop, a condition to make array range checks redundant is derived from C_IN[B] at the beginning (entry point) of the loop and the range which the loop variable can take. For instance, if the loop variable is i and the range it can take is found to be from 1 to less than n, ub(a) is checked in the case of i=n−i, and lb(a) is checked as i=1. It means that array range checks are made redundant as to those which this invention can handle, so those which this invention cannot handle are not included in the above condition. Based on this condition, a check code is generated at the beginning of the loop, and a code for loop processing which does not require array range checks and a code for loop processing which require them are respectively generated.

Meanwhile, in the case that processes of (A) and (C) are to be combinably executed, the following process is performed. For a loop for which a versioning is performed, if the entry point before versioning is B and the entry point to meet versioning conditions after the loop's versioning is B2, C_IN[B] is copied to VERSION[B2]. VERSION_OR[B2] other than the loop's entry points is ø.

Now, the sample program represented in Table 10 describes an example of a case in which the above processing is performed.

TABLE 10

```
/* here is BB1*/
i = 1;
t = 0;
do }
/* here is BB2*/
    i++;
    t += a [i] + a [i−1] + a [i−2]
    if (t < 0) {
        /* here is BB3*/
        i++;
        t += a [i] + a [i−1] + a [i−2] + a [5];
    }
    /* here is BB4*/
    i++;
    t += a [i] + a [i−1] + a [i−2] + a [i−3];
} while (i < n);
/* here is BB5*/
```

BB represents a basic block, and the number following it is that of the basic block.

First, the step 110 of FIG. 2 is executed for each basic block. Since BB1 has no array access, C_GEN[BB1] is empty. As step 110 is executed in reverse order of the program execution, lb(a)<=i−2 and i<=ub(a) are first included in C_GEN[BB2]. The next instruction is i++, addition of a constant to an array index since i=i+1 is performed. Accordingly, 1 is added to i in lb(a)<=i−2 and i<=ub(a). Namely, lb(a)<=(i+1)−2=i−1 and i+1<=ub(a) are input in C_GEN[BB2].

lb(a)<=i−2, i<=ub(a), lb(a)<=5 and 5<=ub(a) are first included in C_GEN[BB3]. If C_GEN[BB3] is modified by the next instruction i++, it becomes lb(a)<=i−1, i+1<=ub(a), lb(a)<=5 and 5<=ub(a). Likewise, C_GEN[BB4] becomes lb(a)<=i−2, i+1<=ub(a). These are summarized as follows.

| BB1: | ø |
|---|---|
| BB2: | lb (a) <= i−1, i+1 <= ub (a) |
| BB3: | lb (a) <= i−1, i+1 <= ub (a) |
|  | lb (a) <= 5, 5 <= ub (a) |
| BB4: | lb (a) <= i−2, i+1 <= ub (a) |
| BB5: | ø |

For instance, an array range check is stored in a storage as follows. Namely, (1) an array base, (2) a term of an array index which includes an index variable, (3) maximum constant offset of an array index, and (4) minimum constant offset of an array index. In the case of C_GEN[BB2], a[i] appears first so that (1) a (2) i (3) 0 (4) 0 are stored. a[i−1] appears next, so they become (1) a (2) i (3) 0 (4) −1. Lastly, a[i−2] appears, so they become (1) a (2) i (3) 0 (4) −2. However, the next instruction in reverse order of the program execution is i++, accordingly i of (2) becomes i+1, and the execution results are reflected on (3) and (4) so that (1) a (2) i (3) +1 (4) −1 are stored in a storage. Likewise, in the case of C_GEN[BB3], they change from (1) a (2) i (3) 0 (4) 0 to (1) a (2) i (3) 0 (4) −1, and to (1) a (2) i (3) 0 (4) −2, and then to (1) a (2) i (3) 1 (4) −1. In addition, data of (1) a (2) null (3) 5 (4) 5 is also stored in a storage. In the case of C_GEN[BB4], they change from (1) a (2) i (3) 0 (4) 0 to (1) a (2) i (3) 0 (4) −1, and to (1) a (2) i (3) 0 (4) −2, and then to (1) a (2) i (3) 0 (4) −3. The change of (2) is reflected on (3) and (4) by i++ so that (1) a (2) i (3) +1 (4) −2 are stored in a storage.

Figure 4:
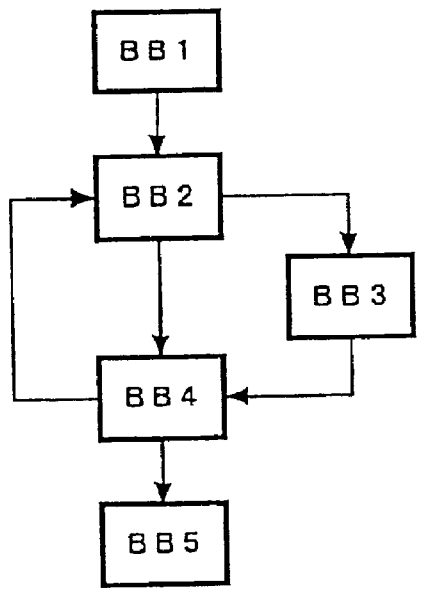
FIG. 4 is a flow graph of the example in Table 10.

A flow graph of Table 10 is shown in FIG. 4. The beginning of BB2 is the entry point of the loop. Since S ∈ Succ(B) is a basic block immediately after B, it is BB2 for BB1, BB3 and BB4 for BB2, BB4 for BB3, BB5 and BB2 for BB4, and none for BB5. However, in the case of this invention, since the conditions of S ∈ Succ(B) and that B and S are in the same loop must be met, there is no applicable basic block in BB1. Moreover, only BB2 becomes the subject since for BB4, BB5 is not in the same loop. The following summarizes the basic blocks which meets the conditions of S ∈ Succ(B) and B and S being in the same loop.

BB1: ∅

BB2: BB3, BB4

BB3: BB4

BB4: BB2

BB5: ∅

Figure 3:
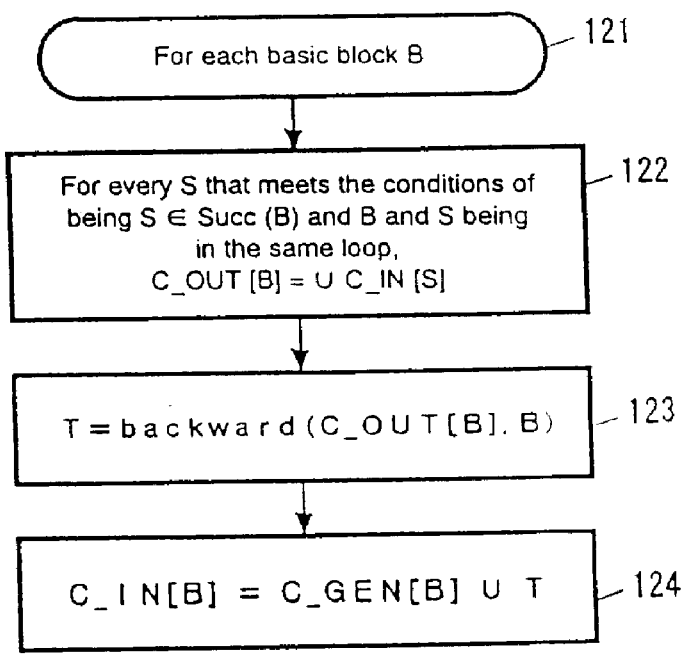
FIG. 3 is a flowchart for showing the processing of step 120 in FIG. 2.

In step 120 of FIG. 2, C_IN[B] is sought in order of a post-order traversal of a depth-first search. In the example of Table 10, the process of FIG. 3 is performed once in order of BB5, BB4, BB3, BB2 and BB1. First, as to BB5, since basic block S meeting the aforementioned conditions is empty, C_OUT[BB5] is also empty and so is C_GEN [BB5], and C_IN[BB5] is also empty. While the basic block which meets the aforementioned conditions about BB4 is BB2, C_OUT[BB4] is empty since C_IN[BB2] is not yet calculated. However, since C_GEN[BB4] is lb(a)<=i−2, i+1<=ub(a) as mentioned above, C_IN[BB4] is lb(a)<=i−2, i+1<=ub(a) (in the case of the aforementioned storage method, (1) a (2) i (3) +1 (4) −2).

As the basic block which meets the aforementioned conditions about BB3 is BB4, it is C_OUT[BB3] =C_IN [BB4]. backward(C_OUT[BB3], BB3) is sought next. Since the operation of array index variable i in BB3 is addition of 1 (a constant), i of lb(a)<=i−2, i+1<=ub(a) in C_OUT[BB3] is replaced with i+1. Accordingly, T={lb(a) <=i−1, i+2<=ub(a)} (in the case of the aforementioned storage method, (1) a (2) i (3) +2 (4) −1). In addition, since C_GEN[BB3] is lb(a)<=i−1, i+1<=ub(a), lb(a)<=5 and 5<=ub(a), C_IN[BB3], which is a sum set of C_GEN[BB3] and T is lb(a)<=i−1, i+2<=ub(a), lb(a)<=5 and 5<=ub(a) (in the case of the aforementioned storage method, (1) a (2) null (3) 5 (4) 5 and (1) a (2) i (3) +2 (4) −1).

As the basic blocks which meet the aforementioned conditions about BB2 are BB3 and BB4, it is C_OUT [BB2]=C_IN[BB3]∪ C_IN[BB4]. However, since C_IN [BB4] is empty, it becomes C_OUT[BB2]=C_IN[BB3]. Then, backward(C_OUT[BB2], BB2) is sought next. Since the operation of array index variable i in BB2 is addition of 1 (a constant), i of lb(a)<=i−1, i+2<=ub(a), lb(a)<=5 and 5<=ub(a) in C_OUT[BB2] is replaced with i+1. Accordingly, T={lb(a)<=i, i+3<=ub(a), lb(a)<=5, 5<=ub(a)} (in the case of the aforementioned storage method, (1) a (2) null (3) 5 (4) 5 and (1) a (2) i (3) +3 (4) 0). And C_IN[BB2] which is a sum set of C_GEN[BB2] (=lb(a)<=i−1, i+1<= ub(a)) and T becomes lb(a)<=−1, i+3<=ub(a), lb(a)<=5 and 5<=ub(a) (in the case of the aforementioned storage method, (1) a (2) null (3) 5 (4) 5 and (1) a (2) i (3) +3 (4) −1).

Since there is no basic block which meets the aforementioned conditions about BB1 and C_GEN[BB1] is also empty, both C_OUT[BB1] and C_IN[BB1] are empty. The above is summarized as follows.

| C_IN [B] | |
|---|---|
| BB1: | ∅ |
| BB2: | lb (a) <= i−1, i+3 <= ub (a) |
|  | lb (a) <= 5, 5 <= ub (a) |
| BB3: | lb (a) <= i−1, i+2 <= ub (a) |
|  | lb (a) <= 5, 5 <= ub (a) |
| BB4: | lb (a) <= i−2, i+1 <= ub (a) |
| BB5: | ∅ |

| C_OUT [B] | |
|---|---|
| BB1: | ∅ |
| BB2: | lb (a) <= i−2, i+2 <= ub (a) |
|  | lb (a) <= 5, 5 <= ub (a) |
| BB3: | lb (a) <= i−2, i+1 <= ub (a) |
| BB4: | ∅ |
| BB5: | ∅ |

Next, a check code for a versioning is generated by using C_IN[BB2], the information at the beginning of BB2 which is the loop's entry point. Here, it is C_IN[BB2]={lb(a)<= i−1, i+3<=ub(a), lb(a)<=5, 5<=ub(a)}. Moreover, since the first line of BB1 in Table 10 shows i=1 and the last line of BB4 shows i<n, it is understood 1<=i<=n−i. Accordingly, it is 1<=n−1, and since i is 1 if it is minimum, it is lb(a)<= 1−1=0, and since i is n−1 if it is maximum, it is (n−1)+3= n+2<=ub(a), 5<=ub(a). lb(a)<=5 is a condition included in lb(a)<=0.

If the above conditions are met, no array range check will be necessary. On the other hand, if the above conditions are not met, array range checks will be necessary. As to an execution code in the case that array range checks are necessary, a code for performing necessary array range checks will be appended to Table 10. The code to be appended may be generated by means of background art, or it may be appended by using a method of the present invention described later. The following Table 11 shows the results of Table 10 which shows a state of no special process performed as to the parts requiring array range checks. Table 11 merely shows the processing results of the present invention, and in reality an executable code such as Table 11 is generated.

TABLE 11

```
i = 1;
t = 0;
if (1 <= n − 1 &&
    lb (a) <= 0 && /* a language whose lb (a) is 0 or less
    does not need this check */
    n+2 <= ub (a) &&
    5 <= ub (a) ) {
    /* when the condition is met */
    do {
        /* handle as if set elements in C_IN[BB2] are checked
        at the beginning of BB2
            check (lb (a) <= i − 1);
            check (i+3 <= ub(a) );
            check (lb (a) <= 5);
            check (5 <= ub (a) );
        to insert and eliminate */
        i++;
        t += a[i] + a[i − 1] + a[i − 2]; /* no check required */
        if (t < 0) {
            i++;
            t += a[i] + a[i − 1] + a[i − 2] + a[5]; /* no check
            required */
    }
```

TABLE 11-continued

```
        i++;
        t += a[i] + a[i - 1] + a[i - 2] + a[i - 3]; /* no check
            required */
    }while(i < n);
} else {
    /* when the condition is not met */
    do {
        i++;
        check (lb (a) <= (i - 2);
        check (i <= ub (a) );
        t += a[i] + a[i - 1] + a[i - 2];
        if (t < 0) {
            i++;
            check (i <= ub (a) );
            check (lb (a) <= i - 2);
            check (lb (a) <= 5);
            /* a language whose lb (a) is 5 or less does not
               need this check */
            check (5 <= ub (a) );
            t += a[i] + a[i - 1] + a[i - 2] + a[5];
        }
        i++;
        check (lb (a) <= i - 3);
        check (i <= ub (a) );
        t += a[i] + a[i - 1] + a[i - 2] + a[i - 3];
    } while (i < n);
}
```

As shown in the comment, an array range check which is not necessary if lb(a) is 5 or less is also presented. For instance, since lb(a) is 0 in Java, check(lb(a)<=5) is not necessary.

Figure 5:
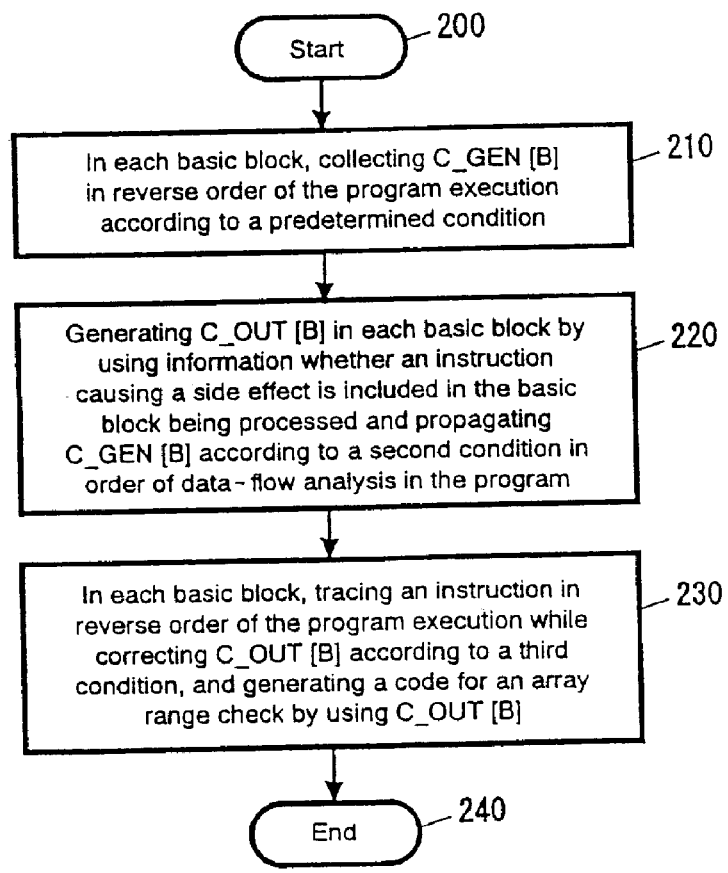
FIG. 5 is a flowchart for showing the main processing of (B), the part for optimizing an array range check by performing data-flow analysis in reverse order of the program execution.

(B) The part to optimize array range checks by performing data-flow analysis in reverse order of the program execution This process is outlined in FIG. 5. First, in each basic block, C_GEN[B] is collected in reverse order of the program execution according to a predetermined condition (step 210). The results of collection are stored in a storage. The predetermined condition is described below which is different from that of step 110 in FIG. 2. However, the meaning of C_GEN[B] is the same. Then, C_OUT[B] is generated in each basic block by using information whether an instruction causing a side effect is included in the basic block being processed and propagating C_GEN[B] according to a second condition in order of data-flow analysis in the program (step 220). C_OUT[B] is stored in a storage. A backward process in (A) is performed in relation to the second condition. Lastly, in each basic block, each instruction is traced in reverse order of the program execution while correcting C_OUT[B] according to a third condition, a code for array range check is generated by using C_OUT[B] (step 230). The generated code is stored in a storage. Each step is described in detail below.

In step 210, if there is an instruction which causes a side effect by moving an array range check issuing an exception before the instruction, C_GEN[B] is made empty, and on the assumption that, if an array index variable is modified by means other than addition of a positive or negative constant, the array range check related to so modified array index variable is not handled, C_GEN[B], the array range check set information required in basic blocks is sought in reverse order of the program execution. Incidentally, a side effect means that an execution result is different before and after moving, namely that the instruction is consequently no longer executed. Examples of this side effect instruction include an instruction which causes an exception, an instruction to write to a heap area, a function call, and in Java, an instruction which causes a side effect by moving a check such as an instruction to write a local variable in a try region. A pseudocode of step 210 is shown as follows.

TABLE 12

```
for (for each basic block, take out an instruction in
    reverse order of the program execution) {
    switch (instruction) {
        array access:
            for array range check C
                C_GEN[B] += C;
                break;
        modification of array base variable a:
            for (all C ∈ C_GEN[B] ) {
                if (lb (a) or ub (a) on modified array base a is
                    included in C) {
                    C_GEN[B] = C;
                }
                {
                break;
        modification of index v:
            for (all C ∈ C_GEN[B]) {
                if (C comprises modified index variable v
                    or expression f (v) of v) {
                    if (index v is modified by v = v+c
                        (c is a constant) ) {
                        replace v of C with v+c, or f (v) with f (v+c)
                    } else {
                        C_GEN[B] -= C;
                    }
                {
            }
            break;
        an instruction causing a side effect by moving an
        array range check issuing an exception before the
        instruction:
            C_GEN[B] = ø;
            break;
    }
}
```

It is the same as a process shown in Table 8 except that, in the case of an instruction which causes a side effect by moving, before the instruction, an array range check which causes an exception (hereafter, a side effect instruction), a case to make C_GEN[B] empty ø was added. If such a condition is met, C_GEN[B] is made empty since the array range check cannot be moved.

In step 220, data-flow analysis through the following expression is performed by using this C_GEN[B] so as to generate C_OUT[B].

TABLE 13

Figure 6:
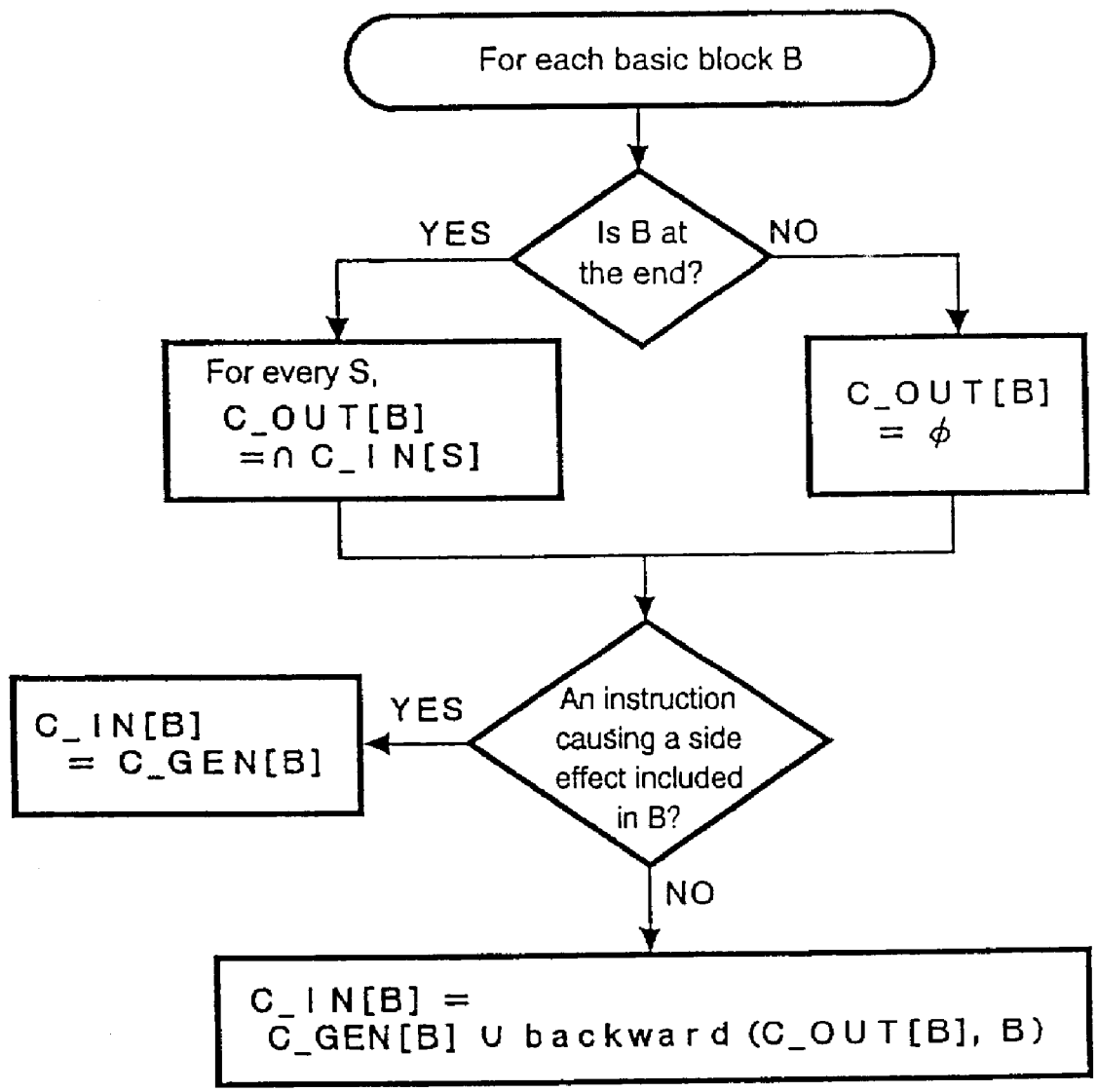
FIG. 6 is a flowchart for showing the processing of step 220 in FIG. 5.

```
if B is not a basic block at the end, for S ∈ Succ(B),
    C_OUT [B] = ∩ C_IN [S]
on the other hand, if B is a basic block at the end,
    C_OUT [B] = ø
if (a side effect instruction is in B) {
    C_IN [B] = C_GEN [B]
} else {
    C_IN [B] = C_GEN [B] ∪ backward (C_OUT [B], B)
}
``` backward(C_OUT[B], B) is the same as one shown in Table 9. Table 13 shows that, in seeking C_OUT[B], it is necessary to calculate a product set of C_IN[S] if B is not at the end, and to make C_OUT[B] empty if B is at the end. As mentioned above, S is every basic block immediately after B. C_IN[B] is acquired by C_IN[B]=C_GEN[B] if there is an instruction in B which causes a side effect, and by C_IN[B]=C_GEN[B] ∪backward(C_OUT[B], B) if there is no instruction in B which causes a side effect. The above is summarized in FIG. 6.

Step 230 is a process to generate a code for an array range check based on C_OUT[B]. The following shows a pseudocode.

TABLE 14

```
for (for each basic block, take out an instruction in
reverse order of the program execution)
    switch (instruction)
        array access:
            for the array range check C
            exist = FALSE;
            for (all C' ∈ C_OUT [B]) {
                if (C ⊆ C') {
                    exist = TRUE;
                    if C ⊆ C') {
                        an array range check code is generated with C as C'.
                        break;
                    }
                }
            }
            if ( !exist) {
                C_OUT [B ] += C;
                C's array range check code is generated.
                break;
            }
        modification of array base variable a:
            for (all C ∈ C_OUT [B]) {
                if (lb (a) or ub (a) on modified array base a is
                    included in C) {
                    C_OUT [B] -= C;
                }
            }
            break;
        modification of index v:
            for (all C ∈ C_OUT[B]) {
                if (C comprises modified index variable v
                    or expression f (v) of v) {
                    if (index v is modified by i = i+c
                        (c is a positive or negative constant) ) {
                        replace v of C with v+c, or f (v) with f (v+c).
                    } else {
                        C_OUT [B] -= C;
                    }
                }
            }
            break;
        side effect instruction:
            C_OUT [B] = ø;
            break;
    }
}
```

While Table 14 is similar to Table 12, the content of the process in the case that a taken instruction is an array access, which is the first switch condition, is different. First, after initializing exist to FALSE, array range check C for an array access being processed is checked for every C' in C OUT[B]. If $C \subseteq C'$, exist is made TRUE and it is recorded that C is in overlapping relation with C_OUT[B]. Then, additionally if $C \subset C'$ (in the case that the range of array range check C is smaller than that of C' in C_OUT[B]), a code for an array range check is generated with C' instead of C since performing an array check on C' is more desirable here than an array check on C. On the other hand, since exist cannot be TRUE for any C' unless $C \subseteq C'$, a code for an array range check is generated with this C. However, as a code for an array range check is generated for C here, C is added to C_OUT[B] so as not to perform an array range check of the same range thereafter.

As above, an array range check is optimized. An example of the optimization process of this invention performed to the example in Table 10 is shown below. C_GEN[B] is the same as the processing result in A, since Table 10 does not include any side effect instruction. On the other hand, C_OUT[B] is different because step 220 is different. As BB5 is the end basic block, C_OUT[BB5] is empty. C_GEN[BB5] is empty, so C_IN[BB5] is also empty. C_OUT[BB4] of BB4 is also empty due to the requirement of C_OUT[B]=n C_IN[S]. However, since C_GEN[BB4] is lb(a)<=i-2, i+1<=ub(a), C_IN[BB4] is also lb(a)<=i-2, i+1<=ub(a). In the case that it is stored in a storage as (1) an array base, (2) a term of an array index which includes an index variable, (3) maximum constant offset of an array index, and (4) minimum constant offset of an array index, it will be (1) a (2) i (3) +1 (4) -2.

As C_OUT[BB3] is only acquired from C_IN[BB4], C_OUT[BB3] is also lb(a)<=i-2, i+1<=ub(a). On the other hand, C_IN[BB3] is acquired from C_GEN[BB3] and backward(C_OUT[BB3], BB3). As BB3 includes addition of 1 (a constant), lb(a)<=i-2, i+1<=ub(a) is corrected to T={lb(a)<=i-1, i+2<=ub(a)} (in the aforementioned storage method, (1) a (2) i (3) +2 (4) -1). Since C_GEN[BB3] is lb(a)<=i-1, i+1<=ub(a), lb(a)<=5 and 5<=ub(a), C_IN [BB3] is lastly lb(a)<=i-1, i+2<=ub(a), lb(a)<=5 and 5<=ub (a) (in the aforementioned storage method, (1) a (2) i (3) +2 (4) -1 and (1) a (2) null (3) 5 (4) 5).

C_OUT[BB2] is acquired from a product set of C_IN [BB4] and C_IN[BB3]. Since C_IN[BB4] is lb(a)<=i-2, i+1<=ub(a), and C_IN[BB3] is lb(a)<=i-1, i+2<=ub(a), lb(a)<=5 and 5<=ub(a), C_OUT[BB2] is lb(a)<=i-1, i+1<= ub(a) (in the aforementioned storage method, (1) a (2) i (3) +1 (4) -1). On the other hand, C_IN[BB2] is a sum set of C_GEN[BB2] and backward C_OUT[BB2], BB2). As backward (C_OUT[BB2], BB2) includes addition of 1 (a constant) in BB2, it becomes lb(a)<=i, i+2<=ub(a) (in the aforementioned storage method, (1) a (2) i (3) +2 (4) 0). Since C_GEN[BB2] is lb(a)<=i-1, i+1<=ub(a), C_IN [BB2] is lastly lb(a)<=i-1, i+2<=ub(a) (in the aforementioned storage method, (1) a (2) i (3) +2 (4) -1).

C_OUT[BB1] is acquired from C_IN[BB2]. Accordingly, C_OUT[BB1] is lb(a)<=i-1, i+2<=ub(a) (in the aforementioned storage method, (1) a (2) i (3) +2 (4) -1). C_IN[BB1] is a sum set of C_GEN[BB1] and backward (C_OUT[BB1], BB1). However, since C_GEN[BB1] is empty and there is constant substitution of i (i=0) in BB1 in the backward process, every C in C_OUT[BB1] is eliminated and T will become empty. Accordingly, C_IN[BB1] becomes empty. The above processing results are summarized as follows.

| | |
|---|---|
| C_IN [B] | |
| BB1: | ø |
| BB2: | lb (a) <= i−1, i+2 <= ub (a) |
| BB3: | lb (a) <= i−1, i+2 <= ub (a) |
| | lb (a) <= 5, 5 <= ub (a) |
| BB4: | lb (a) <= i−2, i+1 <= ub (a) |
| BB5: | ø |
| C_OUT [B] | |
| BB1: | lb (a) <= i−1, i+2 <= ub (a) |
| BB2: | lb (a) <= i−1, i+1 <= ub (a) |
| BB3: | lb (a) <= i−2, i+1 <= ub (a) |
| BB4: | ø |
| BB5: | ø |

The process of step 230 is performed next. First, BB1 is processed by using C OUT[BB1]. However, since BB1 has no array access, a code for an array range check is not generated. Next, BB2 is processed by using C_OUT[BB2]. BB2 has an array access. Before application of the present invention, check(i<=ub(a)) and check(i-2>=lb(a)) were required. However, since i+1<=ub(a) of C_OUT[BB2] covers a larger range than i<=ub(a), check(i<=ub(a)) is replaced by check(i+1<=ub(a)). Also, in the case of processing BB3 by using C_OUT[BB3], before application of the present invention, check(i<=ub(a)), check(lb(a)<=i-2), check(lb(a) <=5) and check(5<=ub(a)) were required. However, since i+1<=ub(a) in C_OUT[BB3] covers a larger range than check(i<=ub(a)), this check(i<=ub(a)) is replaced by check (i+1<=ub(a)) to generate a code. Although BB3 includes an operation of adding a constant with an array index variable, it has no effect since it is in reverse order of the program execution with no array access after the operation. BB4 is processed by using C_OUT[BB4] next, but it will be the same state as before application of the present invention since C_OUT[BB4] is empty. BB5 does not require processing. The following Table 15 shows the results of applying this process to Table 10. Meanwhile, Table 15 is presented so as to make the results of applying this invention understandable, and in reality an executable code is generated.

TABLE 15

```
i = 1;
t = 0;
    do {
        i++;
        check(lb(a) <= i−2);
        check(i+1 <= ub(a) ); /*after replacing check(i <=
        ub(a) ) */
        t += a[i] + a[i−1] + a[i−2];
        if (t < 0) {
            i++;
            check(lb(a) <= i−2);
            check(i+1 <= ub(a) ); /*after replacing check(i <=
            ub(a) ) */
            check(lb(a) <= 5);
                /* a language whose lb(a) is 5 or less does not
                    need this check */
            check(5 <= ub(a) );
            t += a[i] + a[i−1] + a[i−2] +a[5];
        }
        i++;
        check(lb(a) <=i−3);
        check(i <= ub(a) );
        t += a[i] + a[i−1] + a[i−2] + a[i−3];
    } while(i < n);
```

Figure 7:
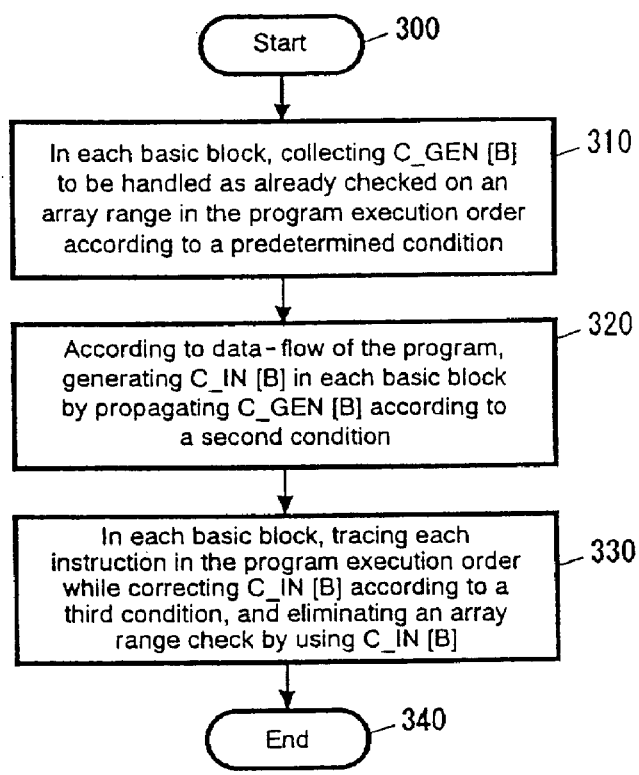
FIG. 7 is a flowchart for showing the main processing of (C), the part for collecting information of array ranges already checked by performing data-flow analysis in the program execution order so as to eliminate a redundant array range check from the information.

(C) The part to perform data-flow analysis in program execution order to acquire information of array range checks already processed so as to eliminate redundant array range checks from the information FIG. 7 outlines this processing. First, in each basic block, C_GEN[B] which is a set of array range checks handled as already checked is collected in program execution order according to a predetermined condition (step 310). This C_GEN[B] is stored in a storage. Then, C_GEN[B] is propagated while being corrected according to a second condition in order of data-flow analysis of the program so as to generate C_IN[B], a set of array range checks handled as already checked at the beginning of each basic block (step 320). C_IN[B] is stored in a storage. Lastly, in each basic block, each instruction is traced in program execution order while correcting C_IN[B] according to a third condition so as to eliminate array range checks by using C_IN[B] (step 330).

Now, step 310 is described. An instruction to modify an array base is not a subject of this invention here. On the other hand, in case that an instruction to add a positive or negative constant to an array index variable is included, an array range check for the array index variable is handled as a subject of this invention. Array range checks related to any other modification instruction are not a subject of this invention. Under such conditions, C_GEN[B] which is a set of array range checks handled as already checked in a basic block is collected in program execution order. Meanwhile, in modifying an array index variable i to i+c (c is a positive or negative constant), array range check information is updated by modifying array index expression f(i) of C_GEN[B] to f(i−c). The following shows a pseudocode of this process.

TABLE 16

```
for (for each basic block, take out an instruction in
program execution order) {
    switch (instruction) {
        array access instruction:
            for the array range check C
                C_GEN[B] += C;
                expansion of C_GEN[B] += C;
            break;
        modification of array base variable a:
            for (all C ∈ C_GEN[B]) {
                if (lb(a) or ub(a) on modified array base a is
                included in C) {
                    C_GEN[B] −= C;
                }
            }
            break;
        modification of index v:
            for (all C ∈ C_GEN[B] ) {
                if (C comprises modified index variable v
                        or expression f (v) of v) {
                    if (index v is modified by i = i+c
                            (c is a positive or negative constant) ) {
                        replace v in C with v−c, or f(v) with f(v−c).
                    } else {
                        C_GEN[B] −= C;
                    }
                }
            }
            break;
    }
}
```

Unlike the above-mentioned (A) and (B), an instruction in each basic block is scanned in program execution order in step 310. In the case of an array access instruction, array range check C of the array access is put into C_GEN[B]. If possible, expansion of C is also put into C_GEN[B]. This expansion is as follows.

(1) An array range check of a range calculated from a minimum constant offset value and a maximum constant offset value of the array index and a lower bound of the array.

Namely, a range of a constant index (lower bound of the array, lower bound of the array+(maximum constant offset value—minimum constant offset value)) is regarded as already checked.

For instance, if a[i−1], a[i+1] are already checked on array ranges in Java language, a[0] to a[2] as to a constant index is also added to C_GEN[B] as already checked.

(2) An array range check of a range calculated from a lower bound of the array and lower and upper bound values of the array index variable.

If it meets either of the following conditions, and a value of an expression of an index calculated based on a lower or upper bound value has the lower bound value of the array or more, the range of the constant index of (value of an index expression calculated based on a lower bound of an array, lower and upper bound values of a variable) is regarded as already checked.

Conditions:

The index expression monotonously increases, and a lower bound value of an index variable is known.

The index expression monotonously decreases, and an upper bound value of an index variable is known.

For instance, if an array access is performed in the form of a[2*i+1] in Java language and it is found that the lower bound value of i is 5, a[0] to a[13] is added to C_GEN[B] as already checked at this check. Also, if an array access is in the form of a[10−i] and it is found that the upper bound value of i is 5, a[0] to a[5] is added to C_GEN[B] as already checked at this check.

A process for modification of base variable a of an array is not different from that of the above (A) and (B). A process for modification of array index variable v is different from that of the above (A) and (B). The array range check is represented by v or f(v), and it can be included in C_GEN[B] only in the case of addition or subtraction by a positive or negative constant. Accordingly, if it is not addition by a positive or negative constant, the elements of C_GEN[B] related to modified array index variable v are eliminated from C_GEN[B]. On the other hand, in the case of addition by a positive or negative constant, subtraction by the constant, as opposed to the modification, is performed to the related array range checks in C_GEN[B]. Namely, if the modification is v+c, v or f(v) of array range check C is replaced by v−c or f(v−c).

Thus, an opposite modification must be performed because the instructions are traced in different directions. In the above-mentioned cases of (A) and (B), as they were in reverse order of the program execution, in the case, for instance, that a modification of i++ exists above (before) i<=ub(a) collected in C_GEN[B], the i of this i<=ub(a) becomes i+1if seen from the beginning of the basic block. On the other hand, since the instructions are traced in program execution order here, in the case, for instance, that a modification of i++ exists below (after) i<=ub(a) collected in C_GEN[B], the i of this i <=ub(a) becomes i−i if seen from the end of the basic block. Thus, there are such differences in handling.

Next, step 320 is described. Here, data-flow analysis with the following expression is performed by using C_GEN[B] collected as above.

As to all P ∈ Pred(B), if B is not an initial block,

C_IN[B]=∩C_OUT[P]

if B is an initial block,

C_IN[B]=∅

C_OUT[B]=C_GEN[B]∪forward(C_IN[B], B)

Figure 8:
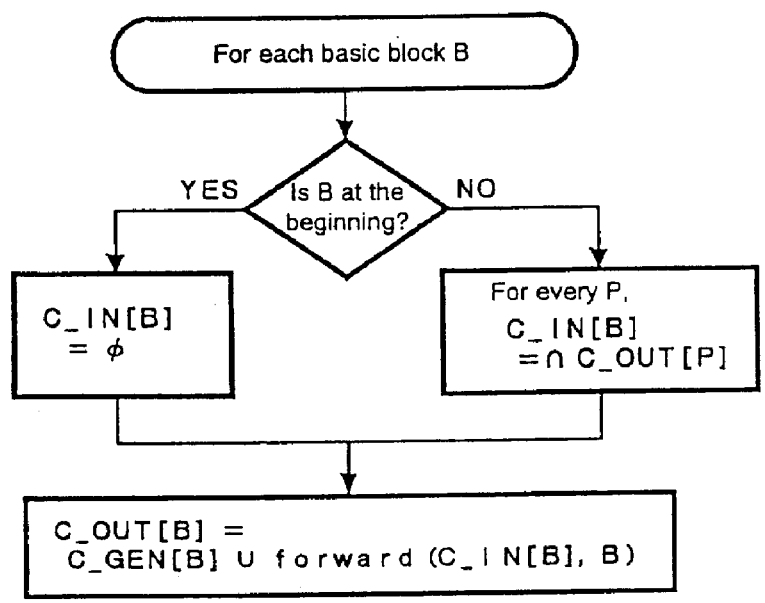
FIG. 8 is a flowchart for showing the processing of step 320 in FIG. 7.

Pred(B) means basic block P which is immediately before B. forward(C_IN[B], B) is described in detail in the following. C_IN[B] in the above expression shows that it becomes a product set of C_OUT[P] of basic block P which is immediately before its basic block B. However, C_IN[B] is empty if B is a basic block at the beginning of the program. C_OUT[B] is acquired by using this C_IN[B]. Namely, C_OUT[B]=C_GEN[B]∪forward(C_IN[B], B). This is summarized in FIG. 8.

When (C) is performed in combination with a process of (A), data-flow analysis with the following expression is performed. VERSION_OR[B] to be used should be created by the process of (A).

As to all P ∈ Pred(B), if B is not an initial block,

C_IN[B]=(∩C_OUT[P])∪VERSION_OR[B]

if B is an initial block,

C_IN[B]=VERSION_OR [B]

C_OUT[B] C_GEN[B]∪forward(C_IN[B], B)

forward(C_IN[B], B) is presented in a pseudocode in Table 17.

TABLE 17

```
forward(C_IN[B], B) {
    T = 0;
    for each check C ∈ C_IN[B] do
        case C of
            lb <= v:
                case AFFECT(B, v) of
                    unchanged: T = T ∪ { lb <= v }
                    increment: if added value c is a constant then
                            T = T ∪ { lb <= v−c }
                        else
                            T = T ∪ { lb <= v }
                    decrement: if subtracted value c is a constant then
                            T = T ∪ { lb <= v+c }
                        /* otherwise not put into T */
                    multiply: T = T ∪ { lb <= v }
                    div > 1: /* not put into T */
                    div < 1: T = T ∪ { lb <= v }
                    changed: /* not put into T */
                end case
            v <= ub:
                case AFFECT(B, v) of
                    unchanged: T = T ∪ { v <= ub }
                    increment: if added value c is a constant then
                            T = T ∪ { v−c <= ub }
                        /* otherwise not put into T */
                    decrement: if subtracted value c is a constant then
                            T = T ∪ { v+c <= ub }
                        else
                            T = T ∪ { v <= ub }
                    multiply: /* not put into T */
                    div > 1: T = T ∪ { v <= ub }
                    div < 1: /* not put into T */
                    changed: /* not put into T */
                end case
            lb <= f (v):
                case AFFECT(B, v) of
                    unchanged: T = T ∪ { lb <= f(v) }
                    increment: if f(v) is a monotonic function and
                            added value c is a constant then
                            T = T ∪ { lb <= f (v−c) }
                        else
                            if v increases f(v) also increases then
                            T = T ∪ { lb <= f(v) }
                    decrement: if f(v) is a monotonic function and
                            subtracted value c is a constant then
                            T = T ∪ lb <= f(v+c) }
                        else
                            if v decreases f(v) increases then
                            T = T ∪ { lb <= f(v) }
                        /* otherwise not put into T */
                    multiply, div < 1:
                        if v increases f(v) also increases then
                            T = T ∪ { lb <= f(v) }
                    div >1: if v decreases f(v) increases then
                            T = T ∪ { lb <= f(v) }
                    changed: /* not put into T */
                end case
            f(v) <= ub:
                case AFFECT(B, v) of
                    unchanged: T = T ∪ { f(v) <= ub }
                    increment: if f(v) is a monotonic function and
                            added value c is a constant then
                            T = T ∪ { f(v−c) <= ub }
                        else
                            if v increases f(v) decreases then
                            T = T ∪ { f (v) <= ub }
                    decrement: if f(v) is a monotonic function and
                            subtracted value c is a constant then
                            T = T ∪ { f(v+c) <= ub }
                        else
                            if v decreases f(v) also decreases then
                            T = T ∪ { f(v) <= ub }
                        /* otherwise not put into T */
                    multiply, div < 1:
                        if v increases f(v) decreases then
                            T = T ∪ { f(v) <= ub }
                    div > 1: if v decreases f(v) also decreases then
                            T = T ∪ f(v) <= ub }
                    changed: /* not put into T */
```

TABLE 17-continued

```
            end case
        end case
    }
    return (T)
}
```

The final output of forward(C_IN[B], B) is T. forward (C_IN[B], B) is roughly divided into four parts depending on the form of array range checks included in C_IN[B]. Namely, it is the case of the form of lb<=v (a lower bound of an array), the case of v<=ub (an upper bound of an array), the case of lb<=f(v) and the case of f(v)<=ub as to array index variable v. Each case is further divided by operation for array index variable v (AFFECT(B, v)). Each case is described as follows.

(1) The case of lb<=v

If there is no operation for array index variable v (unchanged), lb<=v is put as is into T. In the case of an operation of incrementing array index variable v (increment), if added value c is a constant, lb<=v−c is put into T. If c is not a constant, lb<=v is put into T. In the case of an operation of decrementing array index variable v (decrement), if subtracted value c is a constant, lb<=v+c is put into T. If c is a not a constant, the array range check is not put into T. If array index variable v is multiplied (multiply), lb<=is put into T. If array index variable v is divided by a value larger than 1 (div>1), the array range check is not put into T. If array index variable v is divided by a value smaller than 1 (div<1), lb<=is put into T. In case of any operation for array index variable v other than above (changed), the array range check is not put into T.

(2) The case of v<=b

If there is no operation for array index variable v (unchanged), v<=ub is put into T. In the case of an operation of incrementing array index variable v (increment), if added value c is a constant, v<=ub is put into T. If c is not a constant, the array range check is not put into T. In the case of an operation of decrementing array index variable v (decrement), if subtracted value c is a constant, v+c<=ub is put into T. If c is not a constant, v<=ub is put into T. If array index variable v is multiplied (multiply), the array range check is not put into T. If array index variable v is divided by a value larger than 1 (div>1), v<=ub is put into T. If array index variable v is divided by a smaller value than 1 (div<1), the array range check is not put into T. In case of any operation for array index variable v other than above (changed), the array range check is not put into T.

(3) The case of lb<=f(v)

If there is no operation for array index variable v (unchanged), lb<=f(v) is put as is into T. In the case of an operation of incrementing array index variable v (increment), if f(v) is a monotonic function and added value c is a constant, then, lb<=f(c) is put into T. If not so, in the case that f(v) also increases if v increases, then, lb<=f(v) is put into T. In the case of an operation of decrementing array index variable v (decrement), if f(v) is a monotonic function and subtracted value c is a constant, then, lb<=f(v+c) is put into T. If the above condition is not met and in the case that f(v) increases if v decreases, then, lb<=f(v) is put into T. Otherwise, the array range check is not put into T. If array index variable v is multiplied (multiply) and if it is divided by a value smaller than 1 (div<1), in the case that f(v) also increases if v increases, then, lb<=f(v) is put into T. If array index variable v is divided by a value larger than 1 (div>1), in the case that f(v) increases if v decreases, then, lb<=f(v) is put into T. In case of any operation for array index variable v other than the above (changed), the array range check is not put into T.

(4) The case of f(v)<=ub

If there is no operation for array index variable v (unchanged), f(v)<=ub is put as is into T. In the case of an operation of incrementing array index variable v (increment), if f(v) is a monotonic function and added value c is a constant, then, f(v−c)<=ub is put into T. If the above condition is not met and in the case that f(v) decreases if v increases, then, f(v)<=ub is put into T. In the case of an operation of decrementing array index variable v (decrement), if f(v) is a monotonic function and subtracted value c is a constant, then, f(v+c)<=ub is put into T. If the above condition is not met and in the case that f(v) also decreases if v decreases, then, f(v)<=ub is put into T. Otherwise, the array range check is not put into T. If array index variable v is multiplied (multiply) and if it is divided by a value smaller than 1 (div<1), in the case that f(v) decreases if v increases, then, f(v)<=ub is put into T. If array index variable v is divided by a value larger than 1, in the case that f(v) also decreases if v decreases, then, f(v)<=ub is put into T. In case of any operation other than the above (changed), the array range check is not put into T.

The process in step 330 is performed with the following algorithm based on C_IN[B].

TABLE 18

```
for (for each basic block, take out an instruction in
program execution order) {
    switch (instruction) {
        array access instruction:
            for the array range check C
                if (C can determine from C_IN[B] as already
                    checked) {
                    array range check C is eliminated
                } else {
                    C_IN[B] += C;
                }
                break;
        modification of array base variable a:
            for (all C ∈ C_IN[B]) {
                if (lb(a) or ub(a) on modified array base a is
                    included in C) {
                    C_IN[B] −= C;
                }
            }
            break;
        modification of index v:
            for (all C ∈ C_IN[B]) {
                if (C comprises modified index variable v
                    or expression f (v) of v) {
                    if (index v is modified by i = i+c
                        (c is a positive or negative constant)) {
                        replace v with v−c, or f (v) with f (v−c).
                    } else {
                        C_IN[B] −=C;
                    }
                }
            }
        break;
    }
}
```

The difference between Table 18 and Table 16 is the process if an array access instruction is taken out. Here, if it can be determined that array range check C of the array access is already checked from C_IN[B], the array range check C is selected as a subject for elimination. Otherwise, the array range check remains since it is necessary. However, if it remains, it is put into C_IN[B] since it can be used to eliminate following array range checks. Meanwhile, the cases in which it can be determined as already checked from C_IN[B] are not limited to those directly included in array range checks of C_IN[B]. The following cases may also be selected as a subject for elimination.

(1) When an array index is $(I_1+I_2+\ldots+I_n)/N$ and all index variables $I_1$ to $I_n$ have already been checked for the array base, and N is equal to n, this expression can also be handled as covered by the already checked part of an array range. In addition, only in the case of a language whose lower bound of an array is 0, it can also be handled as already checked if N has a value equal to or more than n.

(2) In Java language, when an array index is in the form of a residue such as A (any expression) mod N (N is a constant), if A always takes a positive value, the result will be within the range of 0 to abs(N)−1(abs is an absolute value). If A always takes a positive value, and if the constant value of abs(N)-1 is already checked for the array base, this array access can also be handled as already checked. In the case of a programming language whose lower bound of an array index is not 0, it must also be checked whether constant 0 is already checked.

Here is an example of the above processing applied to Table 15. First, if step 310 is applied to Table 15, C_GEN[B] will be as follows. Namely, as BB1 has no array access, C_GEN[BB1] is empty.

Moreover, BB2 has two array range checks, and lb(a)<=i−2, i+1<=ub(a) is put as is into C_GEN[BB2] (when stored in a storage as (1) an array base, (2) a term of an array index which includes an index variable, (3) maximum constant offset of an array index, and (4) minimum constant offset of an array index, it will be (1) a (2) i (3) +1 (4) −2). In addition, i+1−(i−2) =3 as expansion of these, so lb(a)+3<=ub(a) can also be handled as already checked. Accordingly, this information is also put into C_GEN[BB2] (It is in the case of Java language. In the aforementioned storage method, (1) a (2) null (3) 3 (4) 0).

BB3 has four array range checks, and lb(a)<=i−2, i+1<= ub(a), lb(a)<=5, and 5<=ub(a) can be directly put as is into C_GEN[BB3] (in the aforementioned storage method, (1) a (2) i (3) +1 (4) −2 and (1) a (2) null (3) 5 (4) 5). While lb(a)+3<=ub(a) can be put into C_GEN[BB3] here, it is not performed here as in a language such as Java whose lb(a) is 0, it will be included in 5<=ub(a). BB4 has two array range checks. lb(a)<=i−3 and i<=ub(a) are put as is into C_GEN [BB4] (in the aforementioned storage method, (1) a (2) i (3) 0 (4) −3). In addition, since lb(a)+3<=ub(a) is also derived from these, so it is put into C_GEN[BB4] (It is in the case of Java language. In the aforementioned storage method, (1) a (2) null (3) 3 (4) 0). Since BB5 has no array access, C_GEN[BB5] is empty. The results of C_GEN[B] are summarized as follows.

| BB1: | ø |
|---|---|
| BB2: | lb(a) <= i−2, i+1 <= ub(a) |
|  | lb(a)+3 <= ub(a) |
| BB3: | lb(a) <= i−2, i+1 <= ub(a) |
|  | lb(a) <= 5, 5 <= ub(a) |
| BB4: | lb(a) <= i−3, i <= ub(a) |
|  | lb(a)+3 <= ub(a) |
| BB5: | ø |

The results of step 320 are considered next. Since BB1 is an initial block, C_IN[BB1] is empty. Moreover, since C_GEN[BB1] is also empty in BB1, C_OUT[BB1] is also empty.

Since C_OUT[BB1] is empty, C_IN[BB2] is also empty. As C_GEN[BB2] exists, C_GEN[BB2] as is, becomes C_OUT[BB2]. Namely, lb(a)<=i−2, i+1<=ub (a), lb(a) +3<=ub (a) (In the aforementioned storage method, (1) a (2) i (3) +1 (4) −2. In the case of Java language, (1) a (2) null (3) 3 (4) 0). C_IN[BB3] will be the same as C_OUT[BB2]. C_OUT[BB3] is a sum set of C_GEN[BB3] and forward (C_IN[BB3], BB3). As to T=forward(C_IN[BB3], BB3), since BB3 includes i++, lb(a) <=i−2, i+1<=ub(a) and lb(a)+ 3<=ub(a) of C_IN[BB3] are corrected to lb(a)<=i−3, i<=ub (a) and lb(a)+3<=ub(a) (In the aforementioned storage method, (1) a (2) i (3) 0 (4) +3. In the case of Java language, (1) a (2) null (3) 3 (4) 0). Accordingly, the sum set of C_GEN[BB3] of lb(a)<=i−2, i+1<=ub(a), lb(a)<=5 and 5<=ub(a) is lb(a)<=i−3, i+1<=ub(a), lb(a)<=5 and 5<=ub(a), and lb(a)+3<=ub(a) (In the aforementioned storage method, (1) a (2) i (3) +1 (4) +3and (1) a (2) null (3) 5 (4) 5. In the case of Java language, (1) a (2) null (3) 3 (4) 0).

C_IN[BB4] will be a meet of C_OUT[BB2] and C_OUT[BB3]. Accordingly, it is lb(a)<=i−2, i+1<=ub(a) and lb(a)+3<=ub(a) (In the aforementioned storage method, (1) a (2) i (3) +1 (4) −2. In the case of Java language, (1) a (2) null (3) 3 (4) 0). C OUT[BB4] is a sum set of C_GEN [BB4] and forward(C_IN[BB4], BB4). As to forward(C_ IN[BB4], BB4), since BB4 includes i++, it is lb(a)<=i−3, i<=ub(a) and lb(a)−3<=ub(a) (In the aforementioned storage method, (1) a (2) i (3) 0 (4) −3. In the case of Java language, (1) a (2) null (3) 3 (4) 0). Accordingly, C_OUT[BB4], the sum set with C_GEN[BB4] which is lb(a)<=i−3, i<=ub(a) and lb(a)+3<=ub(a) becomes lb(a)<=i−3, i<=ub(a) and lb(a)+3<=ub(a) (In the aforementioned storage method, (1) a (2) i (3) 0 (4) −3. In the case of Java language, (1) a (2) null (3) 3 (4) 0).

C_IN[BB5] is the same as C_OUT[BB4]. Moreover, C_OUT[BB5] is also the same as C_IN[BB5] since C_GEN[BB5] is empty and BB5 does not have operation of an array index. The results are summarized as follows.

| C_IN [B] | |
|---|---|
| BB1: | ø |
| BB2: | ø |
| BB3: | lb(a) <= i−2, i+1 <= ub(a) |
|  | lb(a)+3 <= ub(a) |
| BB4: | lb(a) <= i−2, i+1 <= ub(a) |
|  | lb(a)+3 <= ub(a) |
| BB5: | lb(a) <= i−3, i <= ub(a) |
|  | lb(a)+3 <= ub(a) |

| C_OUT [B] | |
|---|---|
| BB1: | ø |
| BB2: | lb(a) <= i−2, i+1 <= ub(a) |
|  | lb(a)+3 <= ub(a) |
| BB3: | lb(a) <= i−3, i+1 <= ub(a) |
|  | lb(a)+3 <= ub(a) |
|  | lb(a) <= 5, 5 <= ub(a) |
| BB4: | lb(a) <= i−3, i <= ub(a) |
|  | lb(a)+3 <= ub(a) |
| BB5: | lb(a) <= i−3, i <= ub(a) |
|  | lb(a)+3 <= ub(a) |

Meanwhile, in case of a language whose lb(a), namely a lower bound of array a is 0, the following results are acquired.

|        | C_IN [B]                              |
|--------|----------------------------------------|
| BB1:   | ∅                                      |
| BB2:   | ∅                                      |
| BB3:   | lb(a) <= i−2, i+1 <= ub(a)             |
|        | 3 <= ub(a)                             |
| BB4:   | lb(a) <= i−2, i+1 <= ub(a)             |
|        | 3 <= ub(a)                             |
| BB5:   | lb(a) <= i−3, i <= ub(a)               |
|        | 3 <= ub(a)                             |

|        | C_CUT [B]                              |
|--------|----------------------------------------|
| BB1:   | ∅                                      |
| BB2:   | lb(a) <= i−2, i+1 <= ub(a)             |
|        | 3 <= ub(a)                             |
| BB3:   | lb(a) <= i−3, i+1 <= ub(a)             |
|        | 5 <= ub(a)                             |
| BB4:   | lb(a) <= i−3, i <= ub(a)               |
|        | 3 <= ub(a)                             |
| BB5:   | lb(a) <= i−3, i <= ub(a)               |
|        | 3 <= ub(a)                             |

If the process of step 330 is performed, it will be as follows.

As BB1 has no array access, no process is performed. While there is i++ in BB2, no correction of content is made since C_IN[BB2] is empty, and two array range checks remain without being eliminated. Though two array range checks are added to C_IN[BB2] here, the process for. BB2 ends since there is no longer any array access in BB2.

Next, processing moves on to BB3. C_IN[BB3] is lb(a) <=i−2, i+1<=ub(a) and lb(a)+3<=ub(a), and since i++ exists first, it is corrected. C_IN[BB3] becomes lb(a)<=i−3, i<=ub (a) and lb(a)+3<=ub(a) (In the aforementioned storage method, (1) a (2) i (3) 0 (4) −3. In the case of Java language, (1) a (2) null (3) 3 (4) 0). Next, since there are four array range checks (lb(a)<=i−2, i+1<=ub(a), lb<=5, and 5<=ub (a)), lb(a)<=i−2 can be eliminated from C_IN[BB3]. The remaining array range checks are put into C_IN[BB3] with no processing thereafter.

Next, processing moves on to BB4. C_IN[BB4] is lb(a) <=i−3, i<=ub(a) and lb(a)−3<=ub(a). Since there is i++ in BB4 first, lb(a)<=i−2, i+1<=ub(a) and lb(a)+3<=ub(a) is corrected to lb(a)<=i−3, i<=ub(a) and lb(a)+3<=ub(a) (In the aforementioned storage method, (1) a (2) i (3) 0 (4) −3. In the case of Java language, (1) a (2) null (3) 3 (4) 0). And two array range checks existing in BB4 (lb(a)<=i−3, i<=ub(a)) are both covered by the corrected C_IN[BB4]. Accordingly, all array range checks are eliminated in BB4.

Since there is no array range check in BB5, processing ends. The above results are shown in Table 19. While Table 19 shows a pseudocode, an executable code is generated in reality.

TABLE 19

```
i = 1;
t = 0;
do {
  1++;
  check (lb(a) <= i−2);
  check (i+1 <= ub(a));
  t += a [i] + a [i−1] + a [i−2]
  if (t < 0) {
    i++;
    check (i+1 <= ub(a));
```

TABLE 19-continued

```
    check (lb(a) <= 5);
    /* a language whose lb(a) is 5 or less does not
       need this check */
    check (5 <= ub(a));
    t += a [i] + a [i−1] + a [i−2] + a [5];
  }
  i++;
  t += a [i] + a [i−1] + a [i−2] +a [i−3];
} while ( i < n)
```

The above-mentioned processes of (A), (B) and (C) can be executed singly or combinably, or in combination with background art.

In addition, it is also possible to create a circuit to execute such processing and have it executed on hardware.

Redundant array range checks could successfully be eliminated by the present invention collecting array range check information using data-flow analysis and moving up versionings and checks. Languages in which a program can be written taking advantage of occurrence of exceptions are also supported so that more array range checks could successfully be eliminated.

Furthermore, array range checks could successfully be optimized by collecting array range check information through data-flow analysis. In addition, versionings for loops could successfully be performed.

While the invention has been particularly shown and described with respect to preferred embodiments thereof, it will be understood by those skilled in the art that the foregoing and other changes in form and details may be made therein without departing form the spirit and scope of the invention.

Having thus described our invention, what we claim as new, and desire to secure by Letters Patent is:

1. A method for eliminating a redundant array range check of array range checks in a program, said method comprising the steps of:

in each basic block, collecting a first information about array range checks already processed, in program execution order according to a first condition, said first information being a set of array range checks;

propagating said first information along a data-flow of the program according to a second condition, and generating a second information about array range checks already processed at the beginning of each basic block; and in each basic block, eliminating an array range check by following each instruction in program execution order with modification of said second information according to a third condition and by using the second information.

2. The method according to claim 1, wherein said first condition further comprises conditions of, in a basic block:

if an index variable of an array access is not modified, collecting array range check information for said array access as it is;

if an index variable in an array range check is modified by adding a positive or negative constant, collecting array range check information after reflecting the modification caused by subtracting said constant from said index variable.

3. The method according to claim 1, wherein said first condition further comprises a condition of:

collecting a range defined by upper and lower bounds which can be handled as already checked as to a constant index from a minimum constant offset and a maximum constant offset of an array index in an array range check and a lower bound of the array.

4. The method according to claim 1, wherein said first condition further comprises a condition of:

collecting a range defined by upper and lower bounds which can be handled as already checked as to a constant index from a lower limit value or a upper limit value of an index variable in an array range check and a lower bound of the array.

5. The method according to claim 1, wherein said second condition comprises conditions of:

if a certain basic block is at the beginning of said program, propagating as information about array range checks to be processed at the end of said certain basic block said first information about array range checks already processed itself of said certain basic block; and if said certain basic block is not at the beginning of said program, propagating as information about array range checks to be processed at the end of said certain basic block, a sum set of a third information about array range checks already processed and said first information of said certain basic block, said third information being said second information of said certain basic block after being modified according to a fourth condition.

6. The method according to claim 1, wherein said third condition comprises a condition of:

if an index variable in an array range check is modified by adding a positive or negative constant, correcting to array range check information after reflecting the modification caused by subtracting said constant from said index variable.

7. The method according to claim 5, wherein said fourth condition comprises a condition of:

if, in said certain basic block, an index variable in an array range check included in said second information is modified by adding a positive or negative constant, reflecting the modification caused by subtracting said constant from said index variable on said array range check included in said second information.

8. An apparatus for eliminating a redundant array range check of array range checks in a program, said apparatus comprising:

means for, in each basic block, collecting a first information about array range checks already processed in program execution order according to a first condition, said first information being a set of array range checks;

means for propagating said first information along a data-flow in said program according to a second condition, and for generating a second information about array range checks already processed at the beginning of each basic block; and means for, in each basic block, eliminating array range checks by following each instruction in program execution order with modification of said second information according to a third condition and by using said second information.

* * * * *